US009768421B2

(12) United States Patent
Kwon et al.

(10) Patent No.: US 9,768,421 B2
(45) Date of Patent: Sep. 19, 2017

(54) FLEXIBLE ELECTRODE ASSEMBLY AND ELECTROCHEMICAL DEVICE HAVING THE ELECTRODE ASSEMBLY

(71) Applicant: Samsung Electronics Co., Ltd., Suwon-si, Gyeonggi-do (KR)

(72) Inventors: Moonseok Kwon, Hwaseong-si (KR); Jaeman Choi, Seongnam-si (KR); Euncheol Do, Seoul (KR); Jonghwan Park, Yongin-si (KR); Yoonhoi Lee, Hwaseong-si (KR); Jaejun Chang, Seoul (KR); Yeonji Chung, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 93 days.

(21) Appl. No.: 14/824,408

(22) Filed: Aug. 12, 2015

(65) Prior Publication Data

US 2016/0104871 A1   Apr. 14, 2016

(30) Foreign Application Priority Data

Oct. 10, 2014 (KR) .................. 10-2014-0136960
Apr. 28, 2015 (KR) .................. 10-2015-0060089

(51) Int. Cl.
*H01M 10/052* (2010.01)
*H01M 2/02* (2006.01)
(Continued)

(52) U.S. Cl.
CPC ........... *H01M 2/0275* (2013.01); *H01M 2/14* (2013.01); *H01M 10/04* (2013.01); *H01M 10/0436* (2013.01); *H01M 2220/30* (2013.01)

(58) Field of Classification Search
CPC ..................... H01M 6/10; H01M 10/052
See application file for complete search history.

(56) References Cited

U.S. PATENT DOCUMENTS 6,617,074 B1   9/2003 Watarai et al.
7,939,218 B2   5/2011 Niu
(Continued)

FOREIGN PATENT DOCUMENTS

JP   2007123255 A   5/2007
JP   2012151036 A   8/2012
(Continued)

OTHER PUBLICATIONS

Extended European Search Report for Application No. 15187066. 4-1360 dated Dec. 14, 2015.
(Continued)

*Primary Examiner* — Olatunji Godo
(74) *Attorney, Agent, or Firm* — Cantor Colburn LLP

(57) ABSTRACT

An electrode assembly includes an electrode stack structure including a first electrode assembly sheet having flexibility and a second electrode assembly sheet having flexibility, where and the first and second electrode assemblies are alternately disposed one on another, and a binding unit which binds a portion of the electrode stack structure. The first electrode assembly sheet includes first and second separator films disposed to face each other, a first electrode sheet which is disposed between the first and second separator films and includes a first electrode collector and a first active material layer, and a first confining unit which restricts a movement of the first electrode sheet with respect to the first and second separator films.

33 Claims, 22 Drawing Sheets

(51) Int. Cl.
*H01M 2/14* (2006.01)
*H01M 10/04* (2006.01)

(56) References Cited

U.S. PATENT DOCUMENTS

| | | | |
|---|---|---|---|
| 2005/0284750 A1* | 12/2005 | Nishimura | H01M 2/34 204/252 |
| 2008/0070115 A1 | 3/2008 | Saruwatari et al. | |
| 2008/0187838 A1 | 8/2008 | Le | |
| 2008/0274394 A1 | 11/2008 | Schormann et al. | |
| 2010/0081057 A1 | 4/2010 | Liu et al. | |
| 2010/0119950 A1 | 5/2010 | Hwang et al. | |
| 2010/0209775 A1 | 8/2010 | Kim et al. | |
| 2011/0159367 A1 | 6/2011 | Kim et al. | |
| 2011/0183169 A1 | 7/2011 | Bhardwaj et al. | |
| 2012/0015255 A1 | 1/2012 | Hwang et al. | |
| 2012/0082877 A1 | 4/2012 | Song et al. | |
| 2012/0121963 A1* | 5/2012 | Kwon | H01M 2/0275 429/127 |
| 2013/0022870 A1 | 1/2013 | Choi et al. | |
| 2013/0040201 A1 | 2/2013 | Manthiram et al. | |
| 2013/0083496 A1 | 4/2013 | Franklin et al. | |
| 2013/0108907 A1 | 5/2013 | Bhardwaj et al. | |
| 2013/0136998 A1 | 5/2013 | Hwang et al. | |
| 2013/0280567 A1 | 10/2013 | Kwon et al. | |
| 2013/0288110 A1 | 10/2013 | Schaefer et al. | |
| 2013/0295431 A1 | 11/2013 | Kwon et al. | |
| 2014/0079979 A1 | 3/2014 | Kwon et al. | |
| 2014/0131630 A1 | 5/2014 | Hwang et al. | |
| 2014/0170467 A1 | 6/2014 | Kwon et al. | |
| 2014/0377654 A1 | 12/2014 | Kim et al. | |
| 2015/0072204 A1 | 3/2015 | Kwon et al. | |
| 2015/0076414 A1 | 3/2015 | Hwang et al. | |
| 2015/0111106 A1 | 4/2015 | Son et al. | |
| 2015/0132631 A1 | 5/2015 | Lee et al. | |
| 2015/0207168 A1 | 7/2015 | Do et al. | |
| 2015/0243978 A1 | 8/2015 | Shon et al. | |
| 2015/0243997 A1 | 8/2015 | Park et al. | |
| 2015/0380728 A1 | 12/2015 | Son et al. | |
| 2016/0049660 A1 | 2/2016 | Hwang et al. | |
| 2016/0079625 A1 | 3/2016 | Shon et al. | |
| 2016/0099456 A1 | 4/2016 | Kwon et al. | |
| 2016/0104871 A1 | 4/2016 | Kwon et al. | |
| 2016/0141607 A1 | 5/2016 | Park et al. | |

FOREIGN PATENT DOCUMENTS

| | | |
|---|---|---|
| JP | 2013211262 A | 10/2013 |
| JP | 2014022325 A | 2/2014 |
| KR | 1020070087276 A | 8/2007 |
| KR | 1020110128088 A | 11/2011 |
| KR | 1020130005102 A | 1/2013 |
| KR | 1020140035689 A | 3/2014 |
| KR | 1020140061955 A | 5/2014 |
| KR | 1020140077622 A | 6/2014 |

OTHER PUBLICATIONS

Chen, et al., Oxygen-Aided Synthesis of Polycrystalline Graphene on Silicon Dioxide Substrates, J.A.C.S. Journal of the American Chemical Society, 2011, 133, pp. 17548-17551.

Jeong, et al. Silicon@porous nitrogen-doped carbon spheres through a bottom-up approach are highly robust lithium-ion battery anodes, RSC Advances, 2012, 2, pp. 4311-4317.

Li, et al., Flexible graphene-based lithium ion batteries with ultra-fast charge and discharge rates, PNAS, Oct. 23, 2012, vol. 109, No. 43, pp. 17360-17365.

Wu, et al., Stable cycling of double-walled silicon nanotube battery anodes through solid-electrolyte interphase control, Letters, Nature Nanotechnology, vol. 7, May 2012, pp. 310-315.

Yao, et al., Interconnected Silicon Hollow Nanospheres for Lithuum-Ion Battery Anodes with Long Cycle Life, Nano Letters, 2011, 11, pp. 2949-2954.

Zhu, et al., Directing Silicon-Graphene Self-Assembly as a Core/Shell Anode for High-Performance Lithium-Ion Batteries, Langmuir, American Chemical Society, 2013, 29, pp. 744-749.

Zhong-Shuai Wu et al., Graphene/metal oxide composite electrode materials for energy storage, 2012, p. 107-131, 1, Nano Energy, Elsevier.

Hyung Mo Jeong et al., Silicon@porous nitrogen-doped carbon spheres through a bottom-up approach are highly robust lithium-ion battery anodes, 2012, p. 4311-4317, 2, RSC Advances.

Yan Yao et al. Interconnected Silicon Hollow Nanospheres for Lithium-Ion Battery Anodes with Long Cycle Life, 2011, p. 2949-2954, 11, Nano Letters, ACS Publications.

* cited by examiner

FLEXIBLE ELECTRODE ASSEMBLY AND ELECTROCHEMICAL DEVICE HAVING THE ELECTRODE ASSEMBLY

CROSS-REFERENCE TO RELATED APPLICATIONS

This application claims priority to Korean Patent Application No. 10-2014-0136960, filed on Oct. 10, 2014, and Korean Patent Application No. 10-2015-0060089, filed on Apr. 28, 2015, and all the benefits accruing therefrom under 35 U.S.C. §119, the contents of which in their entireties are herein incorporated by reference.

BACKGROUND

1. Field

The disclosure relates to an electrode assembly, and more particularly, to a flexible electrode assembly and an electrochemical device including the flexible electrode assembly.

2. Description of the Related Art

With developments in electronic technology, markets for various portable electronic device including not only mobile phones, game devices, portable multimedia players ("PMP"s), and MPEG audio layer-3 ("MP3") players, but also smartphones, smart pads, e-book terminals, tablet computers, and wearable medical devices, have rapidly grown. As the market for portable electronic devices grows, the demand for a battery suitable for driving a portable electronic device increases accordingly. Also, since a portable electronic device is desired to be flexible in relation to using, carrying and storing the portable electronic device to have durability to shock, the demand for a flexible battery having features described above is growing.

Secondary batteries, unlike primary batteries that are not chargeable, refer to batteries that are capable of being charged or discharged. In particular, a lithium (Li) secondary battery has merits of having a higher voltage and a higher energy density per unit mass than those of a nickel-cadmium (NiCd) battery or a nickel-hydrogen (Ni—$H_2$) battery and thus the demand for lithium secondary batteries is recently growing. When a battery that is not sufficiently flexible is bent, durability and stability of the battery may be degraded.

SUMMARY

Embodiments of the invention relate to a flexible electrode assembly and an electrochemical device including the flexible electrode assembly.

According to an embodiment of the invention, an electrode assembly includes an electrode stack structure including a first electrode assembly sheet having a flexibility and a second electrode assembly sheet having a flexibility, where the first electrode assembly and the second electrode assembly are alternately disposed one on another, and a binding unit which binds a portion of the electrode stack structure. In such an embodiment, the first electrode assembly sheet includes a first separator film, a second separator film disposed opposite to the first separator film, a first electrode sheet disposed between the first and second separator films, where the first electrode sheet includes a first electrode collector and a first active material layer, and a first confining unit which restricts a movement of the first electrode sheet with respect to the first and second separator films.

In an embodiment, the first and second separator films may include a porous polymer film.

In an embodiment, when the electrode stack structure is bent, an amount of a relative positional change between the first electrode assembly sheet and the second electrode assembly sheet may be relatively larger in a portion located farthest from the binding unit in a lengthwise direction of the electrode stack structure, than in a portion where the binding unit is located.

In an embodiment, the first electrode assembly sheet and the second electrode assembly sheet may not be connected to each other in a portion located farthest from the binding unit in a lengthwise direction of the electrode stack structure.

In an embodiment, the electrode stack structure may further include a stretchable member disposed in a portion located farthest from the binding unit in a lengthwise direction of the electrode stack structure, where the stretchable member connects the first electrode assembly sheet and the second electrode assembly sheet.

In an embodiment, the first confining unit may restrict the movement of the first electrode sheet in a direction perpendicular to a stack direction of the electrode stack structure.

In an embodiment, the first confining unit may include a connecting member which connects the first separator film and the second separator film or a bonding portion which bonds the first separator film and the second separator film.

In an embodiment, the first separator film and the second separator film may define a single unitary and indivisible unit.

In an embodiment, the first electrode sheet may be bonded to at least one of the first and second separator films.

In an embodiment, the at least one of the first and second separator films may be bonded to the first active material layer or the first electrode collector of the first electrode sheet.

In an embodiment, a range of the movement of the first electrode sheet may be restricted between the binding unit and the first confining unit.

In an embodiment, the second electrode assembly sheet may include a second electrode sheet including a second electrode collector and a second active material layer.

In an embodiment, the second electrode assembly sheet may further include a third separator film, a fourth separator film disposed opposite to the third separator film, where the second electrode sheet is interposed between the third and fourth separator films, and a second confining unit which restricts a movement of the second electrode sheet with respect to the third and fourth separator films.

In an embodiment, the first and second separator films may include a porous polymer film.

In an embodiment, the second electrode sheet may be bonded to at least one of the third and fourth separator films.

In an embodiment, the electrode stack structure may further include an additional separator film disposed between the first electrode assembly sheet and the second electrode assembly sheet.

In an embodiment, the binding unit may be disposed at one end portion or at each of opposite end portions of the electrode stack structure, or the binding unit may be disposed between the opposite end portions of the electrode stack structure.

In an embodiment, at least one of the first and second separator films and the second electrode assembly sheet may be bound by the binding unit.

In an embodiment, the first electrode sheet may be bound by the binding unit.

In an embodiment, the binding unit may include at least one of a binding member, a binding hole, a pressure member, and a bonded portion of the electrode stack structure.

In an embodiment, the electrode assembly may further include a protection film disposed on an outer surface of the electrode stack structure.

In an embodiment, a flexibility of the protection film may be less than the flexibility of the first or second separator film.

In an embodiment, the electrode assembly may further include an electrode tab which extends from the electrode stack structure and is electrically connected to each of the first and second electrode assembly sheets.

In an embodiment, the electrode tab may be disposed adjacent to the binding unit.

In an embodiment, an interval between a position where the electrode tab extends and the binding unit may be equal to or less than about 0.3 times a length of the electrode stack structure.

In an embodiment, the electrode assembly may further include a reinforcement member disposed around the electrode tab.

In an embodiment, a length of an area bound by the binding unit may be equal to or less than about 0.5 times a length of the electrode stack structure.

According to another embodiment of the invention, an electrochemical device includes an electrode assembly, an electrolyte, and an exterior member which contains the electrode assembly and the electrolyte. In such an embodiment, the electrode assembly may include an electrode stack structure including a first electrode assembly sheet having a flexibility and a second electrode assembly sheet having a flexibility, where the first and second electrode assemblies are alternately disposed one on another; and a binding unit which binds a portion of the electrode stack structure. In such an embodiment, the first electrode assembly sheet includes a first separator, a second separator film disposed opposite to the first separator film, a first electrode sheet disposed between the first and second separator films and including a first electrode collector and a first active material layer, and a first confining unit which restricts a movement of the first electrode sheet with respect to the first and second separator films.

In an embodiment, the second electrode assembly sheet may include a second electrode sheet that may include a second electrode collector and a second active material layer.

In an embodiment, the second electrode assembly sheet may further include a third separator film, a fourth separator film disposed opposite to the third separator film, where the second electrode sheet is interposed between the third and fourth separator films, and a second confining unit which restricts a movement of the second electrode sheet with respect to the third and fourth separator films.

In an embodiment, the binding unit may be disposed at one end portion or at each of opposite end portions of the electrode stack structure, or the binding unit may be disposed between opposite end portions of the electrode stack structure.

In an embodiment, the electrode assembly may further include a protection film disposed on an outer surface of the electrode stack structure.

In an embodiment, the electrode assembly may further include an electrode tab which extends from the electrode stack structure and is disposed adjacent to the binding unit.

BRIEF DESCRIPTION OF THE DRAWINGS

The above and other features of the invention will become more apparent by describing in further detail exemplary embodiments thereof with reference to the accompanying drawings, in which.

DETAILED DESCRIPTION

Figure 1:
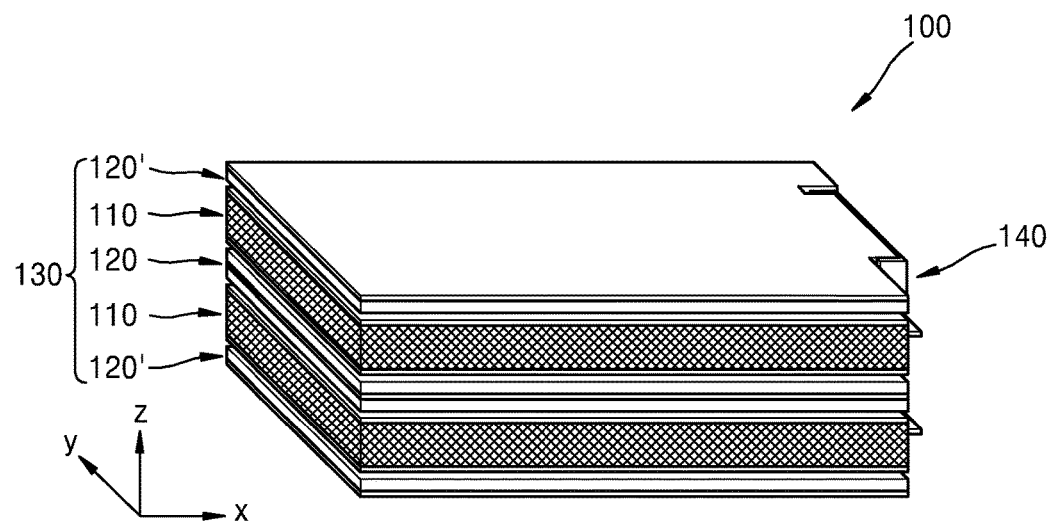
FIG. 1 is a perspective view illustrating an exemplary embodiment of an electrode assembly according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Figure 2:
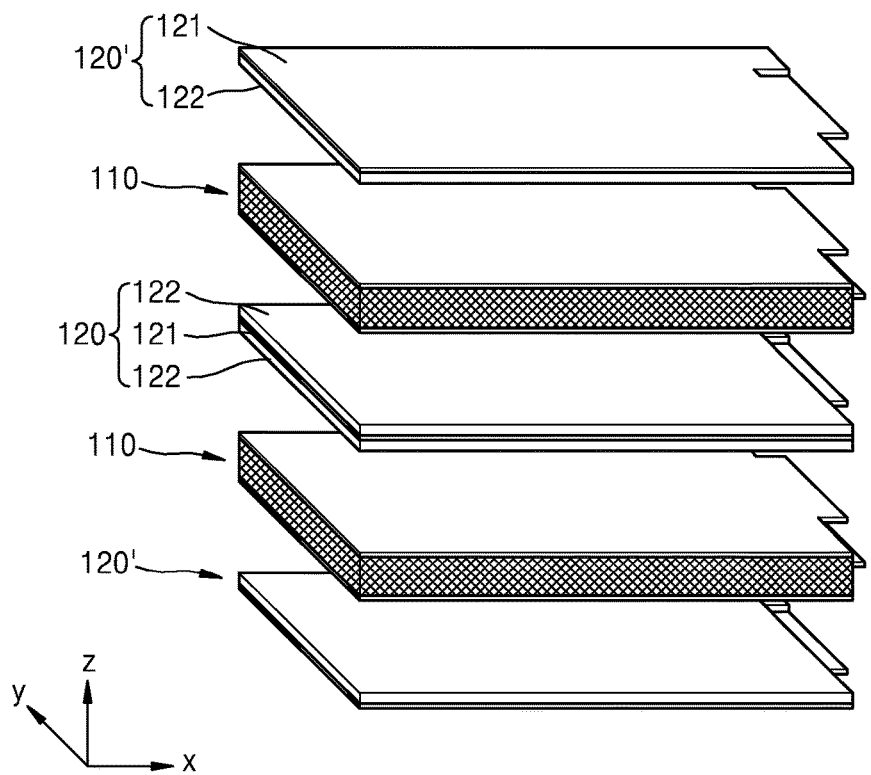
FIG. 2 is an exploded perspective view of the electrode assembly of FIG. 1.
Figure 3:
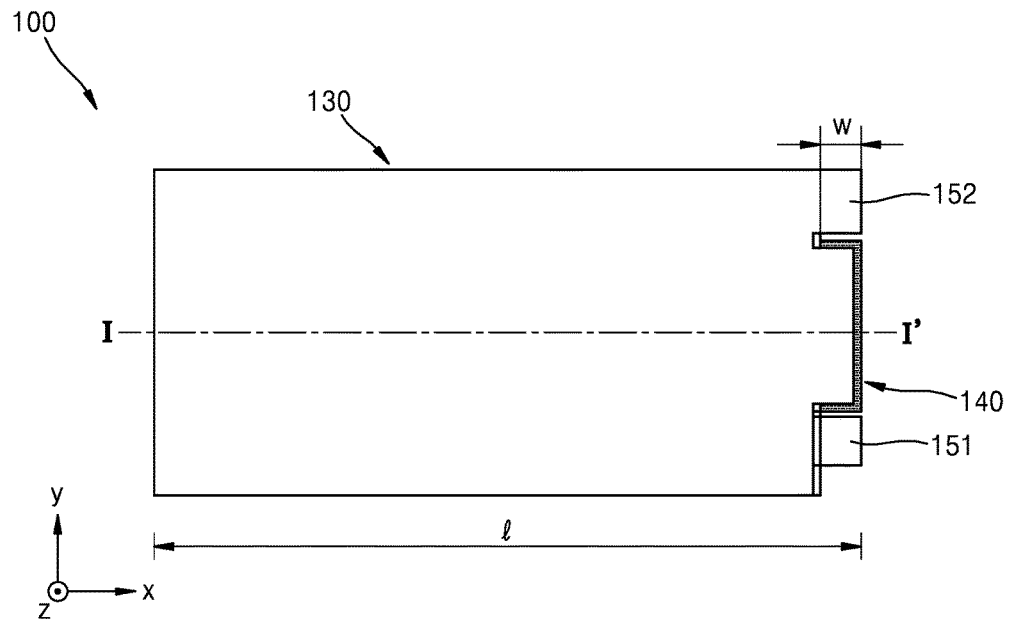
FIG. 3 is a plan view of the electrode assembly of FIG. 1.
Figure 4:
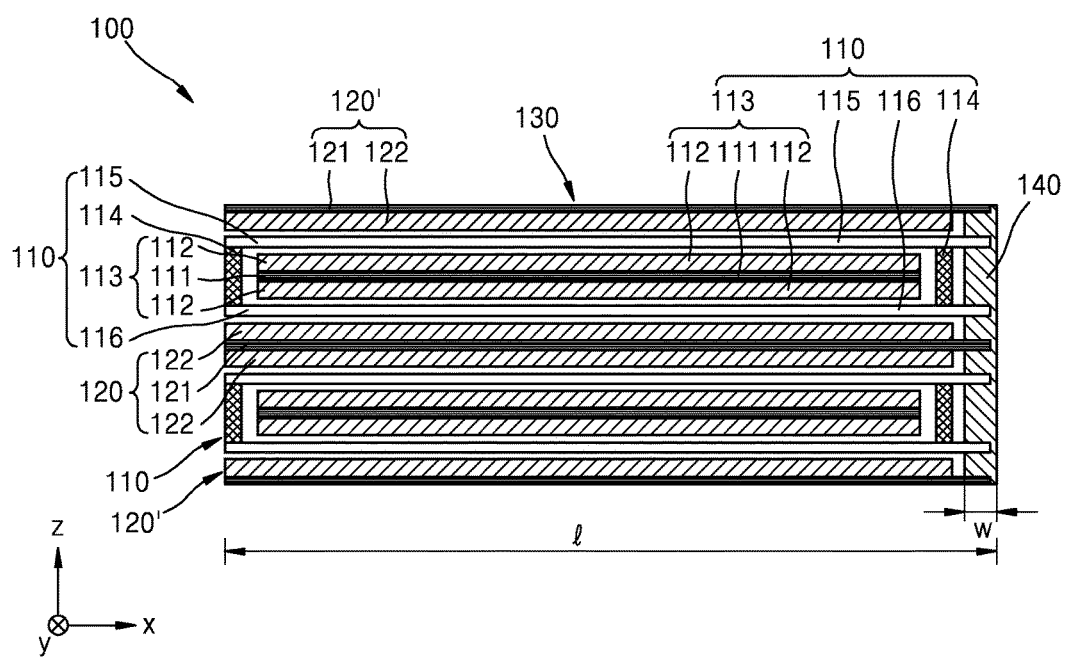
FIG. 4 is a cross-sectional view taken along line I-I' of FIG. 3.

FIG. 1 is a perspective view illustrating an exemplary embodiment of an electrode assembly 100 according to the invention. FIG. 2 is an exploded perspective view of the electrode assembly 100 of FIG. 1. FIG. 3 is a plan view of the electrode assembly 100 of FIG. 1. FIG. 4 is a cross-sectional view taken along line I-I' of FIG. 3.

Referring to FIGS. 1 to 4, an exemplary embodiment of the electrode assembly 100 may include an electrode stack structure 130 and a binding unit 140 that fixes an end portion of the electrode stack structure 130. In such an embodiment, the electrode stack structure 130 may include a first electrode assembly sheet 110 having flexibility and a second electrode assembly sheets 120 or 120' having flexibility. The first and second electrode assembly sheets 110, 120 and 120' are alternately stacked with one another or disposed one on another. In such an embodiment, as shown in FIG. 3, first and second electrode tabs 151 and 152 extend from the electrode stack structure 130 in a predetermined direction, for example, in an x direction that is a lengthwise direction of the electrode stack structure 130. The first electrode tab 151 is electrically connected to the first electrode assembly sheet 110, and the second electrode tab 152 is electrically connected to the second electrode assembly sheet 120 or 120'.

Generally, the flexibility of a material may be defined by a Young's modulus (i.e., a tensile strength) and the flexibility of a sheet may be defined by a Specific Flexure Rigidity ($=Et^3/12$), where E denotes a Young's Modulus, and t denotes the thickness of a sheet. Herein, a material having flexibility means that the material may each independently have a Young's modulus (i.e., a tensile strength) of about 0.01 gigaPascal (GPa) to about 300 GPa, e.g., about 0.05 Gpa to about 220 GPa. Herein, a sheet having flexibility means that the sheet may each independently have a specific flexure rigidity of about $1.04 \times 10^{-10}$ newton-meter (Nm) to about $1.2 \times 10^{-1}$ Nm, e.g., about $8.33 \times 10^{-10}$ Nm to about $9.75 \times 10^{-3}$ Nm, or about $1.15 \times 10^{-9}$ Nm to $2.6 \times 10^{-3}$ Nm.

Figure 5:
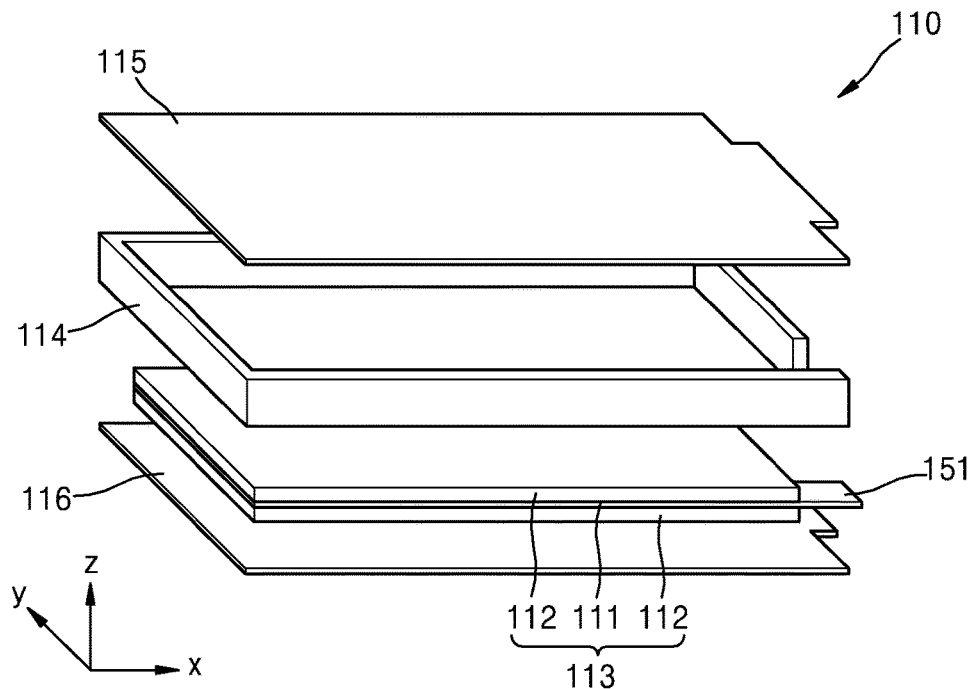
FIG. 5 is an exploded perspective view of an exemplary embodiment of a first electrode assembly sheet of FIG. 1.
Figure 6:
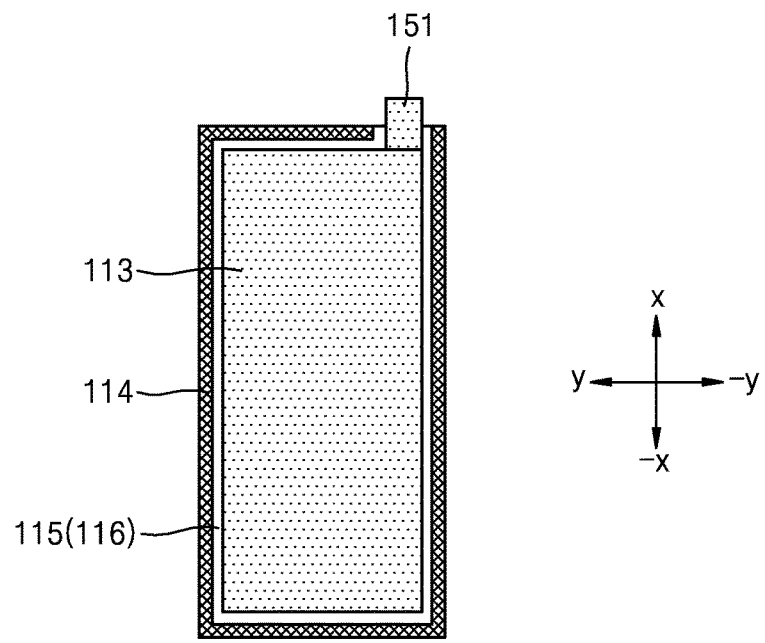
FIG. 6 is a plan view of a first electrode assembly sheet of FIG. 5.

FIG. 5 is an exploded perspective view of an exemplary embodiment of the first electrode assembly sheet 110 of FIG. 1. FIG. 6 is a plan view of the first electrode assembly sheet 110 of FIG. 5.

Referring to FIGS. 5 and 6, an exemplary embodiment of the first electrode assembly sheet 110 may include first and second separator films 115 and 116 disposed opposite to each other or to face each other, a first electrode sheet 113 disposed between the first and second separator films 115 and 116, and a confining unit 114 which restricts or limits a movement of the first electrode sheet 113. The first electrode sheet 113 may include a first electrode collector 111 and a first active material layer 112 disposed on the first electrode collector 111. In one exemplary embodiment, for example, the first active material layer 112 may be provided on both opposing surfaces (e.g., top and bottom surfaces) of the first electrode collector 111. In an alternative exemplary embodiment, the first active material layer 112 may be provided on only one surface (e.g., one of the top and bottom surfaces) of the first electrode collector 111. In an exemplary embodiment, the first electrode sheet 113 may be a positive electrode sheet. In such an embodiment, the first electrode collector 111 may be a positive collector, and the first active material layer 112 may be a positive active material layer. In an alternative exemplary embodiment, the first electrode sheet 113 may be a negative electrode sheet. In such an embodiment, the first electrode collector 111 may be a negative collector, and the first active material layer 112 may be a negative active material layer.

Herein, the positive collector may include a metal including, for example, aluminum, stainless steel, titanium, copper, silver, or a combination of materials selected therefrom. The positive active material layer may include a positive active material, a binder, and a conductive material. In an exemplary embodiment, where the electrode assembly 100 is an electrode assembly of a lithium secondary battery, the positive active material layer may include a material that may reversibly insert and desert lithium ions.

Herein, the positive active material may include at least one selected from, for example, a lithium transition metal oxide such as a lithium cobalt oxide, a lithium nickel oxide, a lithium nickel cobalt oxide, a lithium nickel cobalt aluminum oxide, a lithium nickel cobalt manganese oxide, a lithium manganese oxide, lithium iron phosphate, nickel sulfide, copper sulfide, sulfur, iron oxide and a vanadium oxide.

Herein, the binder may include at least one selected from, for example, a polyvinylidene fluoride-based binder such as polyvinylidene fluoride, vinylidene fluoride/hexafluoropropylene copolymer or vinylidene fluoride/tetrafluoroethylene copolymer; a carboxymethyl cellulose-based binder such as sodium-carboxymethyl cellulose or a lithium-carboxymethyl cellulose; an acrylate-based binder such as polyacrylic acid, lithium-polyacrylic add, acrylic, polyacrylonitrile, polymethyl methacrylate or polybutyl acrylate binder; polyamideimide; polytetrafluoroethylene; a polyethylene oxide; polypyrrole, lithium-nafion; and a styrene butadiene rubber-based polymer.

Herein, the conductive material may include at least one selected from, for example, a carbon-based conductive material such as carbon black, carbon fiber, graphene, graphene oxide and graphite; metal fiber such as conductive fiber; metal powder such as carbon fluoride powder, aluminum powder and nickel powder; conductive whiskers such as a zinc oxide and potassium titanate; a conductive metal oxide such as a titanium dioxide; and a conductive polymer such as polyphenylene derivatives.

Herein, the negative collector may include at least one selected from, for example, copper, stainless steel, nickel, aluminum, and titanium. The negative active material layer may include the negative active material, the binder and the conductive material. In an exemplary embodiment, where the electrode assembly 100 is an electrode assembly of the lithium secondary battery, the negative active material layer may include a material that may be alloyed with lithium or may reversibly insert and desert lithium ions.

Herein, the negative active material may include at least one selected from, for example, metal, a carbon-based material, a metal oxide, and a lithium metal nitride. The metal may include at least one selected from lithium, silicon, magnesium, calcium, aluminum, germanium, tin, lead, arsenic, antimony, bismuth, silver, gold, zinc, cadmium, mercury, copper, iron, nickel, cobalt, and indium. The carbon-based material may include at least one selected from graphite, graphitized carbon fiber, coke, meso carbon microbeads ("MCMB"), polyacene, pitch-based carbon fiber, and hard carbon. The metal oxide may include at least one selected from a lithium titanium oxide, a titanium oxide, a molybdenum oxide, a niobium oxide, an iron oxide, a tungsten oxide, a tin oxide, an amorphous tin oxide compound, a silicon monooxide, a cobalt oxide, and a nickel oxide. Alternatively, the binder and the conductive material included in the negative active material layer may be substantially the same as those included in the positive active material layer.

In an exemplary embodiment, the first electrode sheet 113 may be disposed between the first and second separator films 115 and 116. The first and second separator films 115 and 116 may each include a porous polymer film. In one exemplary embodiment, for example, the first and second separator films 115 and 116 may include a woven fabric or non-woven fabric including polyethylene, polypropylene, and polymer fiber, but not being limited thereto. In an alternative exemplary embodiment, the first and second separator films 115 and 116 may include various materials.

In an exemplary embodiment, the confining unit 114 that restricts a movement of the first electrode sheet 113 is disposed between the first and second separator films 115 and 116. The confining unit 114 restricts the movement of the first electrode sheet 113 relative to the first and second separator films 115 and 116. In one exemplary embodiment, for example, the confining unit 114 may restrict the first electrode sheet 113 from moving in a direction perpendicular to a stack direction of the electrode stack structure 130, that is, a z direction in FIG. 5. In one exemplary embodiment, for example, the confining unit 114 may include a connecting member that connects the first separator film 115 and the second separator film 116. The connecting member may connect the edges of the first and second separator films 115 and 116 with each other. The connection member may include a material having flexibility. Accordingly, the first electrode sheet 113 between the first and second separator films 115 and 116 may be restricted by the confining unit 114 from moving in four directions, that is, x, −x, y, and −y directions, that are perpendicular to the stack direction of the electrode stack structure 130, that is, the z direction of FIG. 5.

The confining unit 114 and the first electrode sheet 113 may not be in a contact state. In an exemplary embodiment, the first electrode sheet 113 may be separated or spaced apart from the confining unit 114 with an interval. The confining unit 114 may indirectly restrict the first electrode sheet 113 in the direction perpendicular to the stack direction of the first electrode sheet 113 by connecting the first separator film 115 and the second separator film 116, although not directly restricting the first electrode sheet 113 in the direction perpendicular to the stack direction. In an alternative exemplary embodiment, the confining unit 114 may prevent the first electrode sheet 113 from approaching the confining unit 114 by maintaining the interval between the first separator film 115 and the second separator film 116 to be less than a thickness of the first electrode sheet 113 at a position close to the confining unit 114. When the electrode assembly 100 is deformed, even if a relative movement between the first and second separator films 115 and 116 and the first electrode sheet 113 occurs, the confining unit 114 may effectively prevent the first electrode sheet 113 from moving out of a predetermined area, space or restriction range. In such an embodiment, the edge of the first electrode assembly sheet 110 may be prevented from being easily damaged by maintaining strength of the confining unit 114 to be greater than those of the first and second separator films 115 and 116. In an alternative exemplary embodiment, the confining unit 114 may prevent a movement of a foreign material between the inside and the outside of an area surrounded by the first and second separator films 115 and 116.

In an exemplary embodiment, the first electrode sheet 113 between the first and second separator films 115 and 116 may be bonded to at least one of the first and second separator films 115 and 116. A portion of the first electrode sheet 113 that is bonded to the first and/or second separator film 115 and 116 may be the first active material layer 112 or the first electrode collector 111. In such an embodiment, where the first electrode sheet 113 is bonded to at least one of the first and second separator films 115 and 116, the movement of the first electrode sheet 113 may be effectively restricted.

Referring back to FIGS. 1 to 4, in an exemplary embodiment, the second electrode assembly sheets 120 and 120' may be second electrode sheets, each including a second electrode collector 121 and a second active material layer 122 disposed on the second electrode collector 121. The second active material layer 122 may be provided on one or both of opposing surfaces of the second electrode collector 121. In one exemplary embodiment, for example, the second active material layer 122 of the second electrode assembly 120 that is disposed inside the electrode stack structure 130 may be provided on both of the opposing surfaces of the second electrode collector 121 thereof, the second active material layer 122 of the second electrode assembly sheet 120' that is provided outside the electrode stack structure 130 may be provided on one of the opposing surfaces of the second electrode collector 121 thereof, but not being limited thereto.

In an exemplary embodiment, the second electrode sheet may be the negative electrode sheet or the positive electrode sheet. In an exemplary embodiment, where the first electrode sheet 113 is the positive electrode sheet, the second electrode sheet may be the negative electrode sheet. In such an embodiment, the second electrode collector 121 may be the negative collector and the second active material layer 122 may be the negative active material layer. In an exemplary embodiment, where the first electrode sheet 113 is the negative electrode sheet, the second electrode sheet may be the positive electrode sheet. In such an embodiment, the second electrode collector 121 may be the positive collector and the second active material layer 122 may be the positive active material layer.

In an exemplary embodiment, the binding unit 140 is disposed at an end portion of the electrode stack structure 130 such that the end portion of the electrode stack structure 130 may be bound by the binding unit 140. The end portion of the electrode stack structure 130, for example, may have a shape of an extension disposed between the first and second electrode tabs 151 and 152. Accordingly, the end portion of the electrode stack structure 130 may have a width narrower than the opposing end portion thereof. In such an embodiment, where the end portion of the electrode stack structure 130 extends with a relatively narrow width and the first and second electrode tabs 151 and 152 are arranged at opposite sides thereof, a relatively large space to accommodate the first or second electrode tab 151 or 152 may be defined. Thus, in such an embodiment, even when the first or second electrode tab 151 or 152 is transformed when the electrode stack structure 130 is bent, stress applied to the first or second electrode tab 151 or 152 may be reduced and thus bending durability of an electro-chemical device including the electrode assembly 100 may be improved. In such an embodiment, where the binding unit 140 is disposed at an end portion having a narrow width of the electrode stack structure 130, a space other than the area bound by the binding unit 140 may allow to secure more capacity, thereby improving energy density of the electro-chemical device.

In an exemplary embodiment, as shown in FIG. 3, a length w of an area bound by the binding unit 140 in the lengthwise direction of the electrode stack structure 130 may be equal to or less than about 0.5 times a length l of the electrode stack structure 130. When the length l of the electrode stack structure 130 is equal to or greater than about 25 millimeters (mm), the length w of the area bound by the binding unit 140 may be equal to or less than about 0.3 times the length l of the electrode stack structure 130. In an exemplary embodiment, the length w of the area bound by the binding unit 140 may be equal to or less than about 0.25 times the length l of the electrode stack structure 130 to improve flexibility of the electrode assembly 100. However, the invention is not limited thereto. The binding unit 140 may be disposed around positions where the first and second electrode tabs 151 and 152 extend, as described below.

In an exemplary embodiment, the binding unit 140 may include a binding member that binds end portions of the first and second electrode assembly sheets 110, 120 and 120'. Referring to FIG. 4, in an exemplary embodiment, an end portion of the first electrode assembly sheet 110 and an end portion of each of the second electrode assembly sheets 120 and 120' may be bound by the binding unit 140. In such an embodiment, the first and second separator films 115 and 116 of the first electrode assembly sheet 110 are bound by the binding unit 140, and the second electrode collector 121 of each of the second electrode assembly sheets 120 and 120' are bound by the binding unit 140. In an alternative exemplary embodiment, instead of the second electrode collector 121, the second active material layer 122 may be bound by the binding unit 140, or both of the second electrode collector 121 and the second active material layer 122 may be bound by the binding unit 140. In the binding unit 140, the first electrode assembly sheet 110 and the second electrode assembly sheets 120 and 120' may not be connected to each other at an opposing end portion of the first and second electrode assembly sheets 110, 120, and 120' that is located farthest from the binding unit 140 in the lengthwise direction of the electrode stack structure 130. In an exemplary embodiment, as shown in FIG. 4, both of the first and second separator films 115 and 116 may be bound by the binding unit 140, but not being limited thereto. In an alternative exemplary embodiment, a separator film of one of the first and second separator films 115 and 116 may be bound by the binding unit 140. In one exemplary embodiment, for example, the first separator film 115 may be shorter than the second separator film 116, and only the second separator film 116 may be bound by the binding unit 140.

In an exemplary embodiment, as shown in FIGS. 1 to 3, the binding unit 140 is disposed between the first and second electrode tabs 151 and 152, but in an alternative exemplary embodiment, the positions of the binding unit 140 and the first and second electrode tabs 151 and 152 are not limited thereto. In one alternative exemplary embodiment, for example, the first and second electrode tabs 151 and 152 maybe arranged adjacent to each other such that the second electrode tab 152 is disposed between the first electrode tab 151 and the binding unit 140.

In an exemplary embodiment, as shown in FIG. 1, the two first electrode assembly sheets 110 and the three second electrode assembly sheets 120 and 120' are alternately stacked with one another, but the numbers of the first and second electrode assembly sheets 110, 120, and 120' may be variously modified. In an exemplary embodiment, as shown in FIG. 1, the second electrode assembly sheets 120' are disposed outside the electrode stack structure 130, but in an alternative exemplary embodiment, the first electrode assembly sheet 110 may be disposed outside the electrode stack structure 130. In another alternative exemplary embodiment, the first and second electrode assembly sheets 110, 120, and 120' may be disposed outside the electrode stack structure 130.

Figure 7:
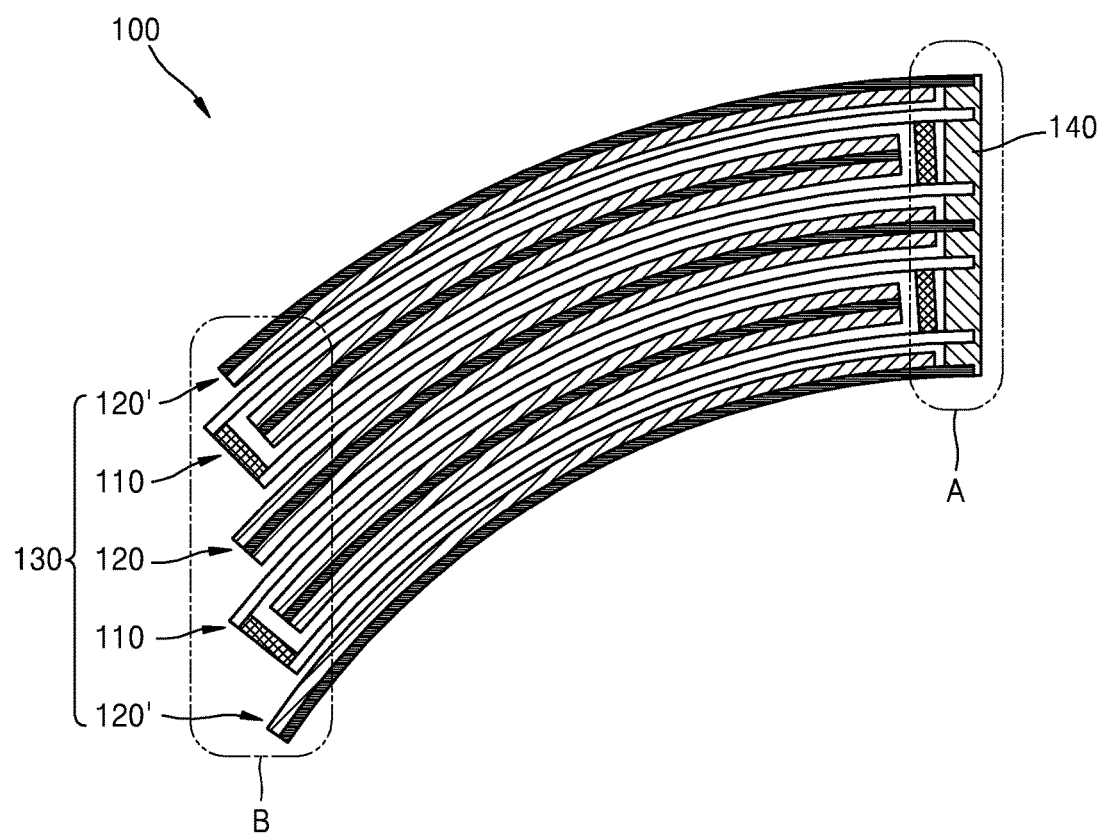
FIG. 7 is a cross-sectional view illustrating the electrode assembly of FIG. 1 in a bent state.

FIG. 7 is a cross-sectional view of the electrode assembly 100 of FIG. 1 in a bent state.

Referring to FIG. 7, when the electrode assembly 100 is bent, that is, in the bent state, slip may occur between the first electrode assembly sheet 110 and the second electrode assembly sheets 120 and 120'. In the bent state, since a first end portion A of the electrode stack structure 130 is bound by the binding unit 140, slip occurs less in the first end portion A where the binding unit 140 is located, compared to a portion that is not bound by the binding unit 140. Accordingly, the degree of a relative position change between the first electrode assembly sheet 110 and the second electrode assembly sheets 120 and 120' that occurs during the bending of the electrode stack structure 130 at the first end portion A where the binding unit 140 is located may be less than that in a second end portion B that is located farthest from the first end portion A in the lengthwise direction of the electrode stack structure 130.

Generally, when an electrode stack structure that is not bound is repeatedly bent, relative positions of individual layers of the electrode stack structure are changed, and thus the individual layers may be misaligned with each other such that stability may be degraded. Also, if a difference in the sizes of a positive electrode sheet, a separator film, and a negative electrode sheet are increased to improve stability, energy density is lowered.

In an exemplary embodiment, the one end portion of the electrode stack structure 130 is bound by the binding unit 140, such that misalignment of the first and second electrode assembly sheets 110, 120 and 120' may be reduced even when the electrode stack structure 130 is repeatedly bent. In such an embodiment, the binding unit 140 binds the first and second separator films 115 and 116 instead of the first electrode sheet 113, a short-circuit problem that may be generated between the first electrode sheet 113 and the second electrode sheet in the binding unit 140 may be effectively prevented. In such an embodiment, the confining unit 114 for restricting a movement of the first electrode sheet 113 is disposed between the first and second separator films 115 and 116, such that even when a misalignment occurs in the binding unit 140, generation of a short-circuit between the first electrode sheet 113 and the second electrode sheet may be effectively prevented. In such an embodiment, a difference in the sizes of the first electrode sheet 113, the first second separator films 115 and 116, and the second electrode sheet may be substantially minimized, and the energy density may be thereby substantially improved.

FIGS. 8A to 8G illustrate various exemplary embodiments of the confining unit 114 of the first electrode assembly sheet of FIG. 1.

Figure 8A:
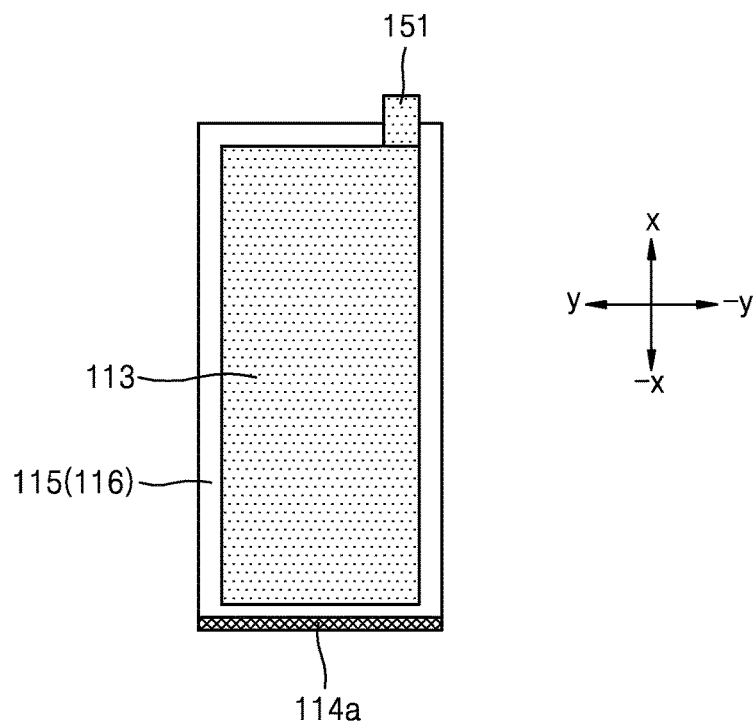
FIGS. 8A to 8G are plan views illustrating exemplary embodiments of a confining unit of the first electrode assembly sheet of FIG. 1.

Referring to FIG. 8A, an exemplary embodiment of a confining unit 114a that restricts the movement of the first electrode sheet 113 may include a connecting member disposed at the lower side of the first electrode sheet 113. In such an embodiment, the confining unit 114a may restrict the movement of the first electrode sheet 113 only in one direction, that is, a −x direction, that is perpendicular to the electrode stack direction. In such an embodiment, the movement of the first electrode sheet 113 in an x direction may be further restricted by the binding unit 140 of FIG. 1 that is provided in an upper side of the first electrode sheet 113, that is, at an opposing end portion of the electrode stack structure 130. In such an embodiment, a range of the movement of the first electrode sheet 113 between the binding unit 140 and the confining unit 114a may be effectively limited.

Figure 8B:
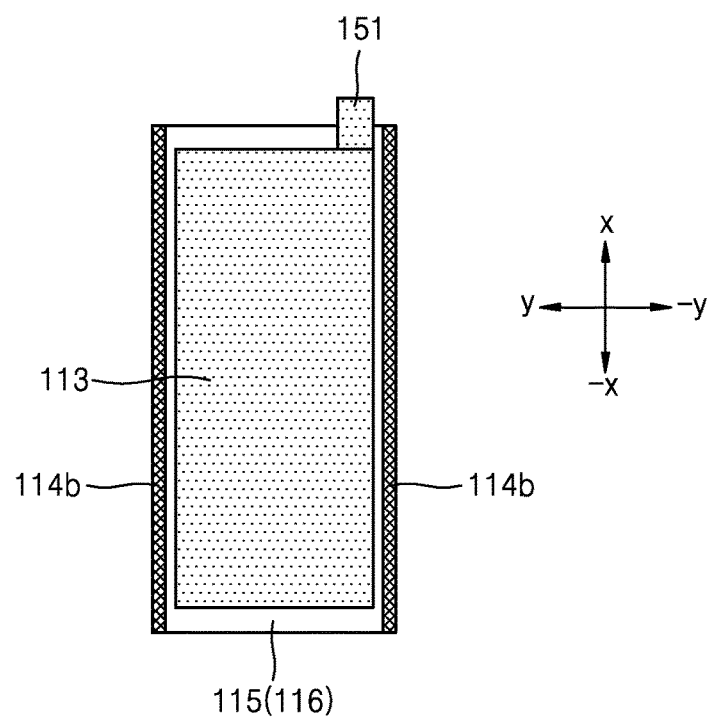

Referring to FIG. 8B, another exemplary embodiment of a confining unit 114b that restricts the movement of the first electrode sheet 113 may include a plurality of connecting members disposed at the left and right sides of the first electrode sheet 113. In such an embodiment, the confining units 114b may restrict the movement of the first electrode sheet 113 in two directions, that is, y and −y directions, that are perpendicular to the electrode stack direction. In such an embodiment, the movement of the first electrode sheet 113 in the x direction may be further restricted by the binding unit 140 in the upper side of the first electrode sheet 113.

Figure 8C:
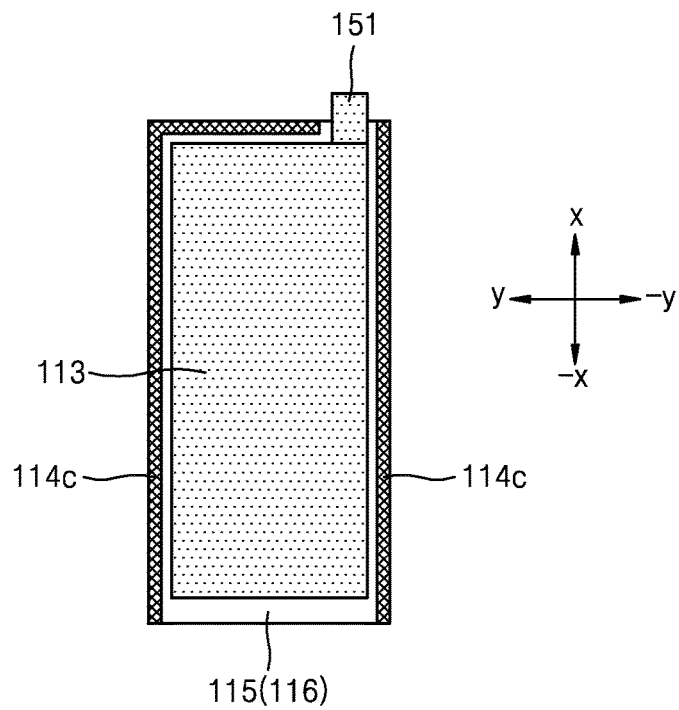

Referring to FIG. 8C, another exemplary embodiment of a confining unit 114c that restricts the movement of the first electrode sheet 113 may include a plurality of connecting members disposed at the left, right, and upper sides of the first electrode sheet 113. In such an embodiment, the confining unit 114c may restrict the movement of the first electrode sheet 113 in three directions, that is, the x, −y, and y directions, that are perpendicular to the electrode stack direction.

Figure 8D:
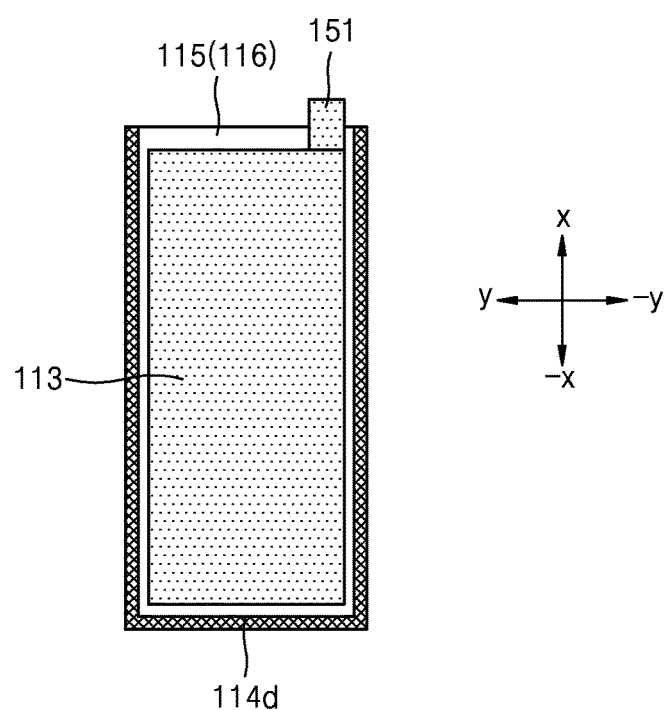

Referring to FIG. 8D, another exemplary embodiment of a confining unit 114d that restricts the movement of the first electrode sheet 113 may include a plurality of connecting members disposed at the left, right, and lower sides of the first electrode sheet 113. In such an embodiment, the confining unit 114d may restrict the movement of the first electrode sheet 113 in three directions, that is, the −x, y, and −y directions, which are perpendicular to the electrode stack direction. In such an embodiment, the movement of the first electrode sheet 113 in the x direction may be further restricted by the binding unit 140 in the upper side of the first electrode sheet 113.

Figure 8E:
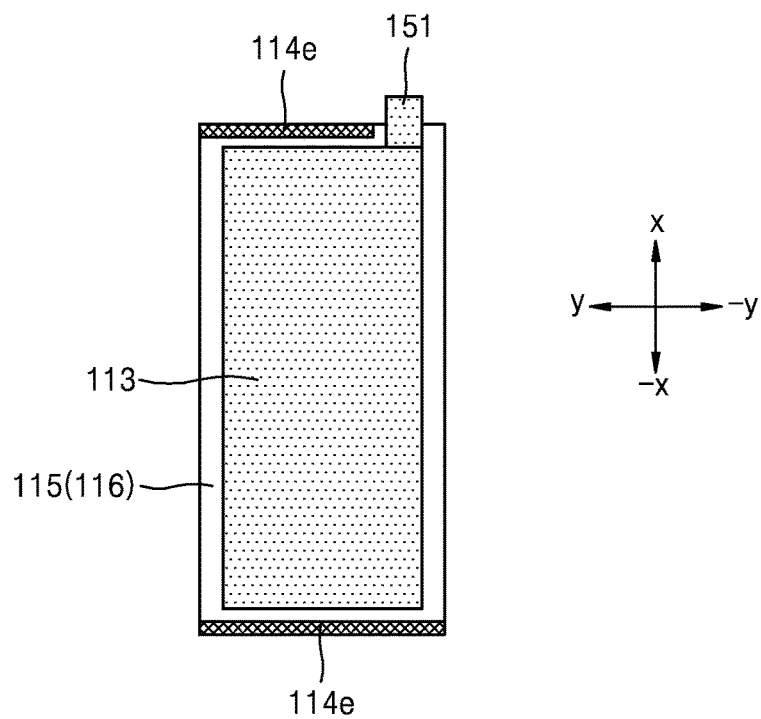

Referring to FIG. 8E, another exemplary embodiment of a confining unit 114e that restricts the movement of the first electrode sheet 113 may include a plurality of connecting members disposed at the upper and lower sides of the first electrode sheet 113. In such an embodiment, the connecting member at the upper side of the first electrode sheet 113 may restrict the movement of the first electrode sheet 113 in the x direction. In such an embodiment, the movement of the first sheet 113 in the y direction may be further restricted by the connecting member provided at the upper side of the first electrode sheet 113 and the first electrode tab 151 connected to the first electrode sheet 113. Accordingly, the confining unit 114e may restrict the movement of the first electrode sheet 113 in three directions, that is, the x, −x, and y directions, that are perpendicular to the electrode stack direction.

Figure 8F:
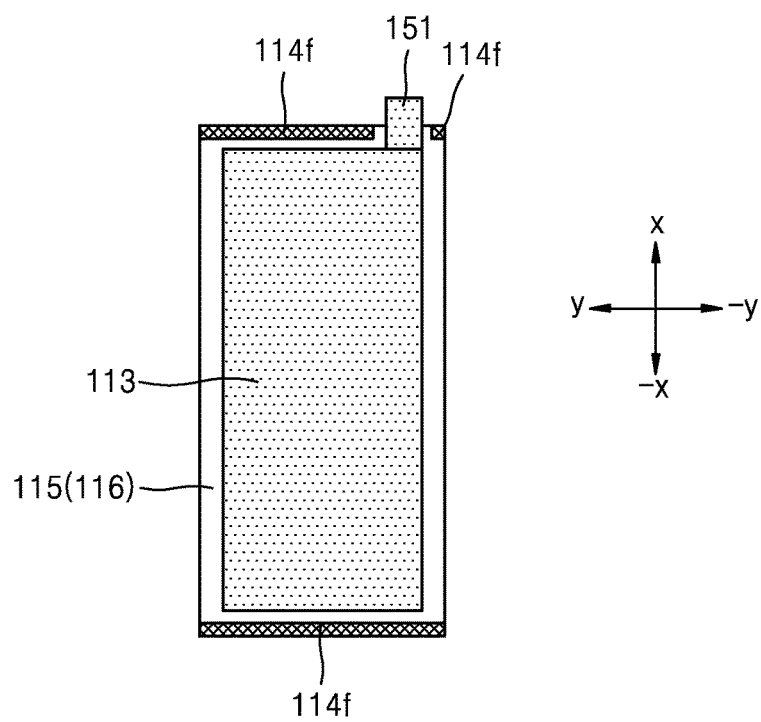

Referring to FIG. 8F, another exemplary embodiment of a confining unit 114f that restricts the movement of the first electrode sheet 113 may include a plurality of connecting members that are provided at the upper and lower sides of the first electrode sheet 113. In such an embodiment, the connecting members at the upper side of the first electrode sheet 113 may restrict the movement of the first electrode sheet 113 in the x direction. In such an embodiment, the movement of the first sheet 113 in the y and −y directions may be further restricted by the connecting members at the upper side of the first electrode sheet 113 and the first electrode tab 151 connected to the first electrode sheet 113. Accordingly, in such an embodiment, the confining unit 114f may restrict the movement of the first electrode sheet 113 in four directions, that is, the x, −x, y, and −y directions, that are perpendicular to the electrode stack direction.

Figure 8G:
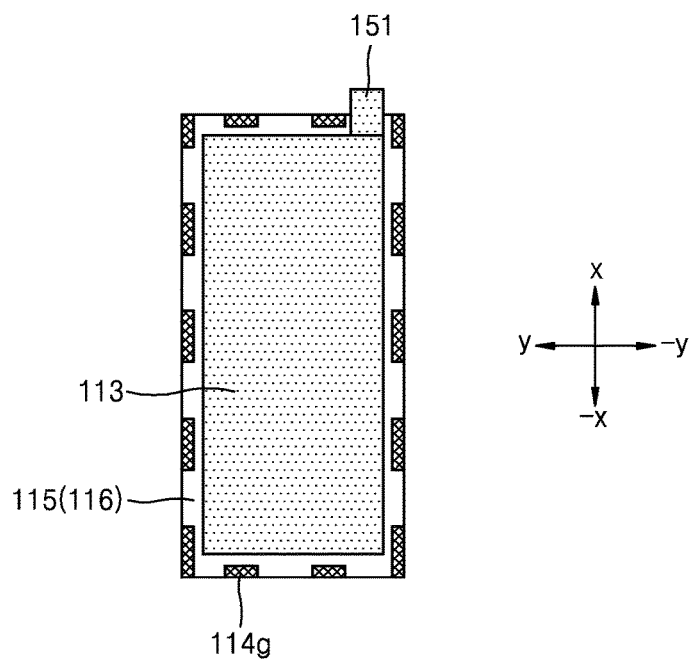

Referring to FIG. 8G, another exemplary embodiment of a confining unit 114g that restricts the movement of the first electrode sheet 113 may include a plurality of connecting members disposed to be spaced apart from each other and along an edge of the first electrode sheet 113. The confining unit 114g may restrict the movement of the first electrode sheet 113 in four directions, that is, the x, −x, y, and −y directions, that are perpendicular to the electrode stack direction. Exemplary embodiments of the confining unit 114a to 114g described above with reference to FIGS. 8A to 8G are merely exemplary, and the invention is not limited thereto. In an alternative exemplary embodiment, the shape and the number of the connecting members of the confining unit may be variously modified.

Figure 9:
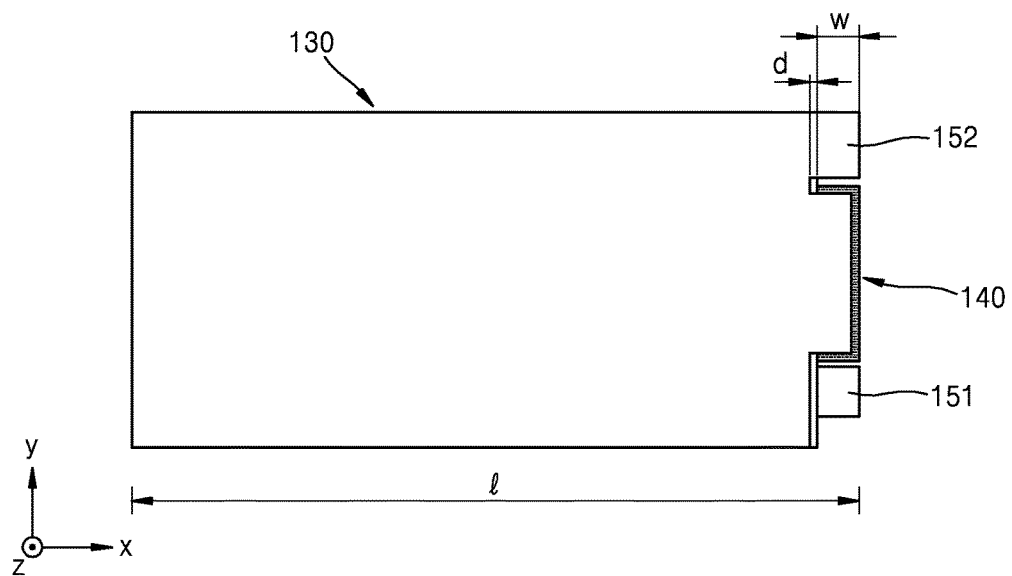
FIG. 9 is a plan view illustrating a relationship between an electrode tab and a binding unit in the electrode assembly of FIG. 1.

FIG. 9 illustrates a relationship between the electrode tab 151 and the binding unit 140 in the electrode assembly 100 of FIG. 1. Referring to FIG. 9, in an exemplary embodiment, the first and second electrode tabs 151 and 152 may be disposed adjacent to the binding unit 140 to prevent damage therein. In such an embodiment, an interval d between the binding unit 140 and a position from which each of the first and second electrode tabs 151 and 152 extends may be equal to or less than about 0.3 times the length l of the electrode stack structure. However, the invention is not limited thereto.

Figure 10:
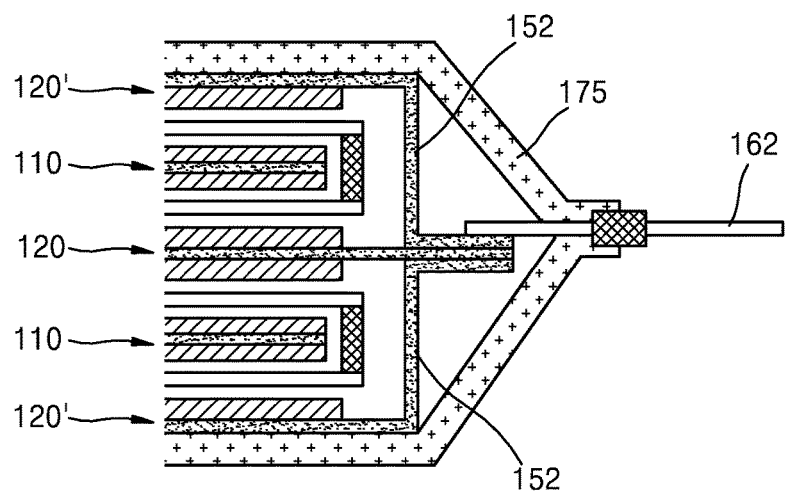
FIG. 10 is a partial cross-sectional view illustrating a reinforcement member provided around the electrode tab in the electrode assembly of FIG. 1.

FIG. 10 illustrates an exemplary embodiment of the electrode assembly 100 where a reinforcement member 175 is disposed around the electrode tab 152. Referring to FIG. 10, the second electrode tab 152 includes an extended portion protruding from the electrode stack structure 130, and the extended portion of the second electrode tab 152 is electrically connected to an external lead tab 162. In such an embodiment, a connecting portion between the extended portion of the second electrode tab 152 and the lead tab 162 or between extended portions of the second electrode tab 152 may be weakened. Accordingly, in such an embodiment, the electrode assembly 100 may further include the reinforcement member 175 disposed around the second electrode tab 152 to reinforce between the extended portion of the second electrode tab 152 and the lead tab 162 or between extended portions of the second electrode tab 152 may be weakened. The reinforcement member 175 may be provided or formed using, for example, a rigid film or an external pouch. Although FIG. 10 illustrates an exemplary embodiment of the reinforcement member 175 that is disposed around the second electrode tab 152, but not being limited thereto. In an alternative the reinforcement member 175 may be provided around the second electrode tab 152 in various methods. In an exemplary embodiment, as show in FIG. 10, the reinforcement member 175 may be disposed around the second electrode tab 152, but not being limited thereto. In an alternative exemplary embodiment, the reinforcement member 175 may be further provided around the first electrode tab 151 of FIG. 3.

Figure 11:
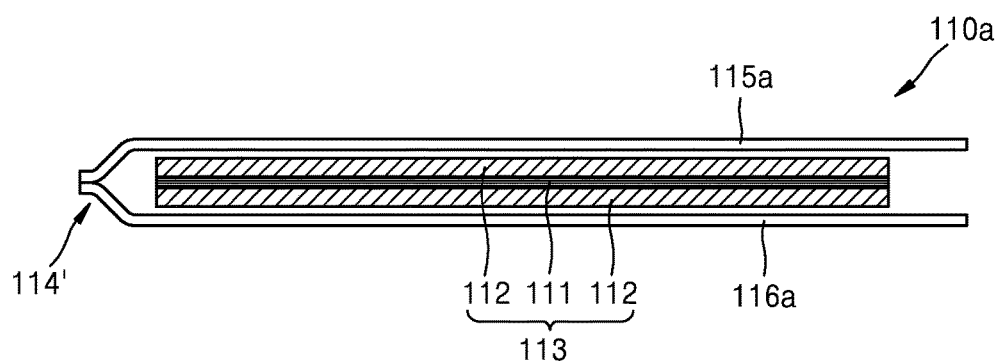
FIG. 11 is a cross-sectional view illustrating an alternative exemplary embodiment of the first electrode assembly sheet of FIG. 1.

FIG. 11 is a cross-sectional view illustrating an alternative exemplary embodiment of the first electrode assembly sheet 110 of FIG. 1. Referring to FIG. 11, an exemplary embodiment of a first electrode assembly sheet 110a may include first and second separator films 115a and 116a disposed to face each other, the first electrode sheet 113 disposed between the first and second separator films 115a and 116a, and a confining unit 114' that restricts the movement of the first electrode sheet 113. The first electrode sheet 113 includes the first electrode collector 111, and the first active material layer 112 disposed on the first electrode collector 111. The confining unit 114' may be defined by portions of the first and second separator films 115a and 116a that are bonded to each other. In one exemplary embodiment, for example, the confining unit 114' may be defined by a bonded portion of the first and second separator films 115a and 116a formed by bonding edges of the first and second separator films 115a and 116a. The confining unit 114' may be defined by a bonded portion of the first and second separator films 115a and 116a formed by bonding the first and second separator films 115a and 116a using an adhesive or by heat welding. However, the invention is not limited thereto, and the bonded portion of the first and second separator films 115a and 116a may be provided in a variety of ways or methods.

Figure 12:
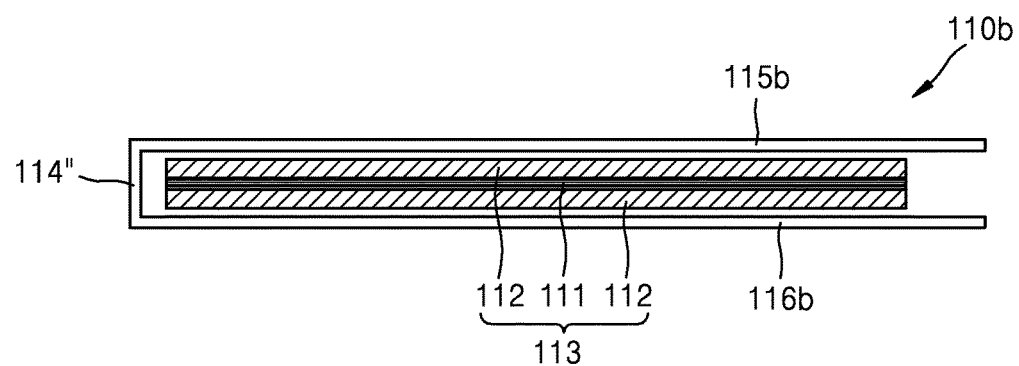
FIG. 12 is a cross-sectional view illustrating another alternative exemplary embodiment of the first electrode assembly sheet of FIG. 1.

FIG. 12 is a cross-sectional view of another alternative exemplary embodiment of the first electrode assembly sheet 110 of FIG. 1. Referring to FIG. 12, an exemplary embodiment of a first electrode assembly sheet 110b may include first and second separator films 115b and 116b disposed to face each other, the electrode sheet 113 disposed between the first and second separator films 115b and 116b, and a confining unit 114" that restricts the movement of the first electrode sheet 113. In such an embodiment, the first and second separator films 115b and 116b may define a single unitary and indivisible unit or be integrally formed as the single unitary and indivisible unit, and the confining unit 114" may be defined by a folded portion where the first and second separator films 115*b* and 116*b* are folded.

Figure 13:
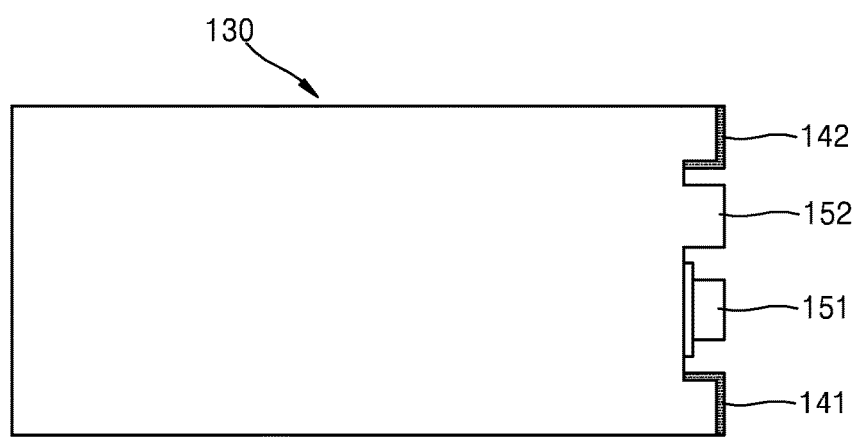
FIG. 13 is a plan view illustrating an alternative exemplary embodiment of the binding unit of the electrode assembly of FIG. 1.

FIG. 13 is a plan view of an exemplary embodiment of the binding unit 140 of the electrode assembly 100 of FIG. 1. Referring to FIG. 13, a plurality of binding units 141 and 142 are disposed at an end portion of the electrode stack structure 130. The binding units 141 and 142 may be separated from each other in a direction that is perpendicular to the lengthwise direction of the electrode stack structure 130. In such an embodiment, as shown in FIG. 13, two binding units 141 and 142 are disposed at one end portion of the electrode stack structure 130, but not being limited thereto. In an alternative exemplary embodiment, three or more binding units may be disposed at one end portion of the electrode stack structure 130.

Figure 14A:
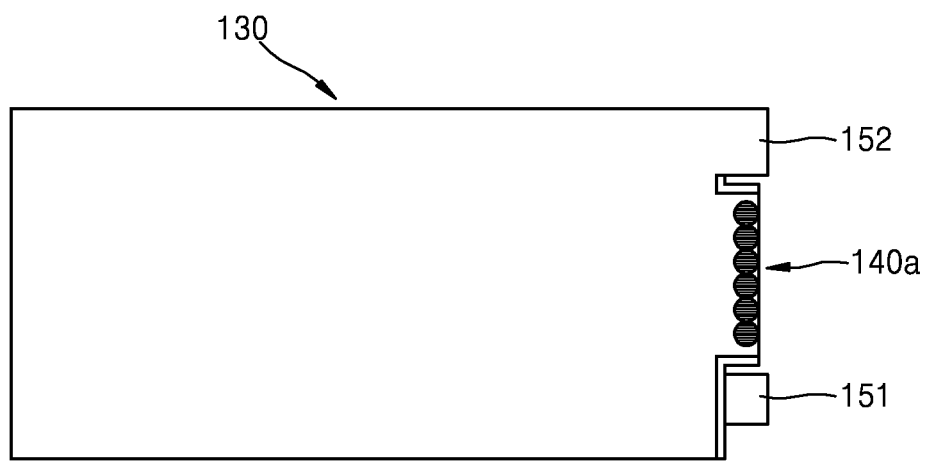
FIGS. 14A to 14C illustrate other alternative exemplary embodiments of the binding unit of the electrode assembly of FIG. 1.
Figure 14B:
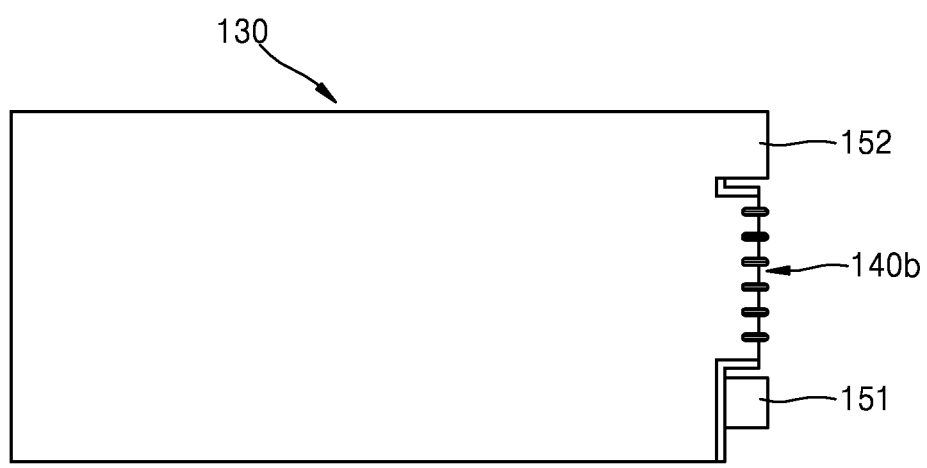
Figure 14C:
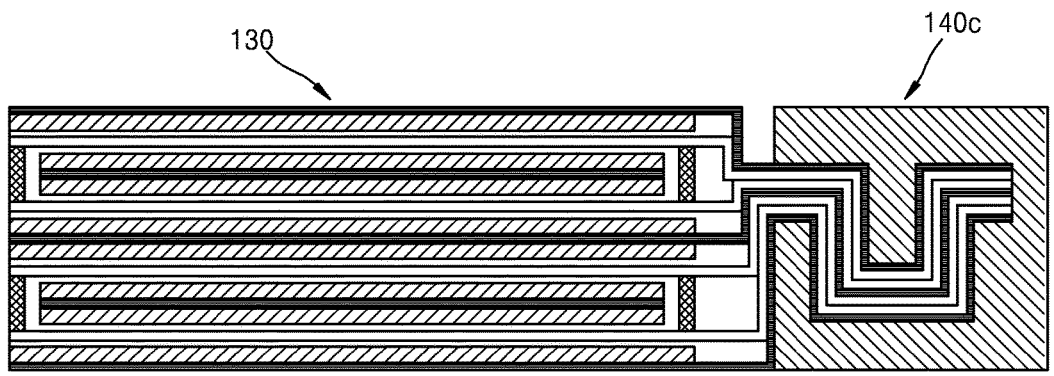

FIGS. 14A to 14C illustrate various exemplary embodiments of the binding unit 140 of the electrode assembly of FIG. 1. Referring to FIG. 14A, an exemplary embodiment of a binding unit 140*a* may be defined by a binding hole formed in the one end portion of the electrode stack structure 130 and a binding material that fills the inside of the binding hole. Referring to FIG. 14B, an alternative exemplary embodiment of a binding unit 140*b* may be defined by a binding hole formed in the one end portion of the electrode stack structure 130 and a binding ring or a binding string inserted into the binding hole. Referring to FIG. 14C, another alternative exemplary embodiment of a binding unit 140*c* may be defined by a pressure member that applies a pressure to each of the one end portions of the first and second electrode assembly sheets 110, 120, and 120' protruding from the electrode stack structure 130 to bind the one end portions of the first and second electrode assembly sheets 110, 120, and 120'. In exemplary embodiment, the binding unit is not limited to the binding units 140*a* to 140*c* illustrated in FIGS. 14A to 14C, and the binding units may be defined or provided in a variety of methods. In one exemplary embodiment, for example, the binding unit may be defined by a bonded portion of the electrode stack structure, e.g., a bonded portion of the first and second electrode assembly sheets 110, 120, and 120' that is provided by bonding the one end portions of the first and second electrode assembly sheets 110, 120, and 120' using an adhesive or by heat welding.

Figure 15:
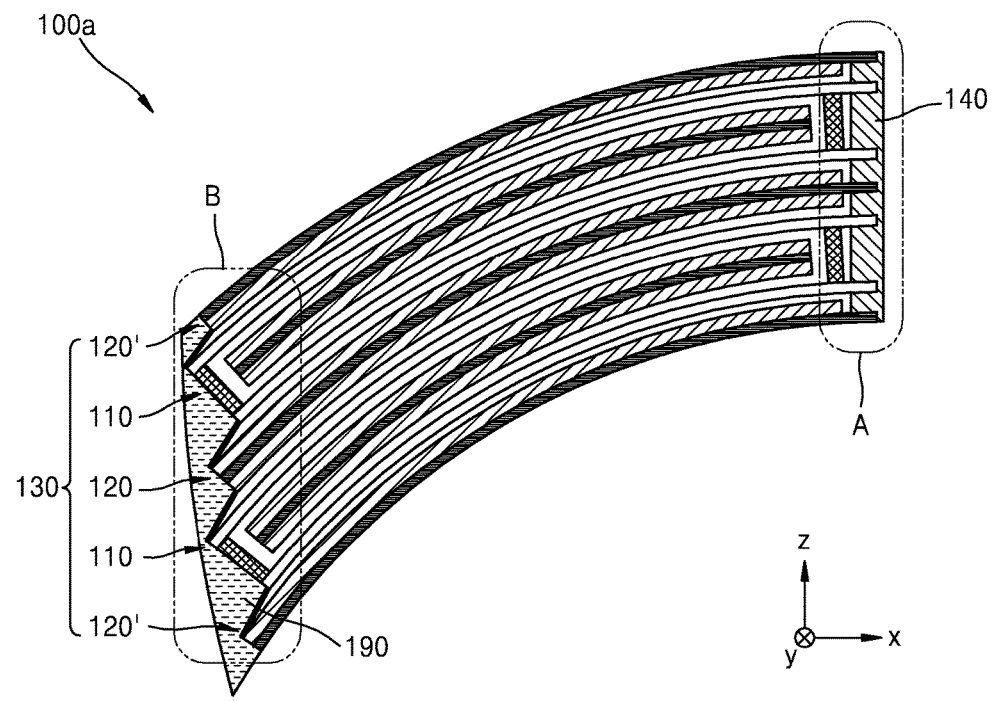
FIG. 15 is a cross-sectional view illustrating an alternative exemplary embodiment of an electrode assembly according to the invention.

FIG. 15 is a cross-sectional view illustrating an alternative exemplary embodiment of an electrode assembly 100*a* according to the invention.

Referring to FIG. 15, in an exemplary embodiment of the electrode assembly 100*a*, the binding unit 140 is disposed at the first end portion A of the electrode stack structure 130, and the electrode stack structure 130 may further include a stretchable member 190 that connects the first electrode assembly sheet 110 and the second electrode assembly sheets 120 and 120' and is disposed at a portion of the electrode assembly 100*a* that is located farthest from the first end portion A in the lengthwise direction of the electrode stack structure 130, that is, at the second end portion B. The stretchable member 190 does not bind the second end portion B of the electrode stack structure 130, but may allow the intervals between the first electrode assembly sheets 110 and the second electrode assembly sheets 120 and 120' at the second end portion B to be uniform during the bending of an electrode layer structure 130.

Figure 16:
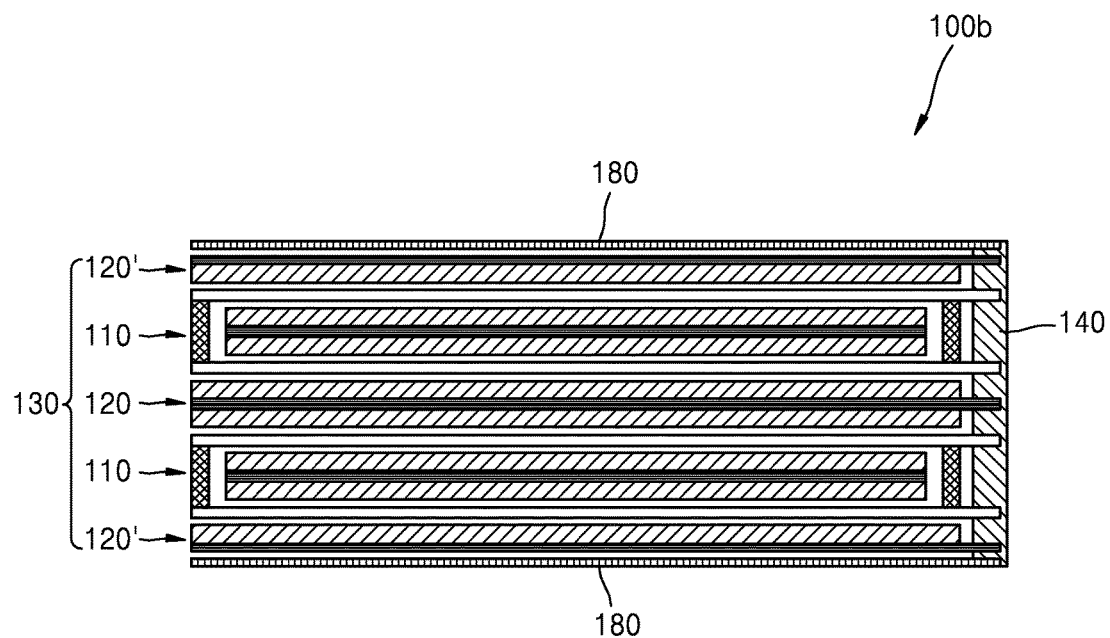
FIG. 16 is a cross-sectional view illustrating another alternative exemplary embodiment of an electrode assembly according to the invention.

FIG. 16 is a cross-sectional view illustrating another alternative exemplary embodiment of an electrode assembly 100*b* according to the invention.

In an exemplary embodiment, as shown in FIG. 16, the electrode assembly 100*b* may include the electrode stack structure 130, the binding unit 140 disposed at the one end portion of the electrode stack structure 130, and a protection film 180 disposed on an outer surface of the electrode stack structure 130. The protection film 180 may protect the electrode stack structure 130 from a physical shock or chemical influence that may be externally applied to the electrode stack structure 130. The protection film 180 may include a material that has a predetermined degree of flexibility and strength, which are determined not to substantially affect the bending of the electrode stack structure 130. The protection film 180 may include, for example, polymer, metal, or a fiber reinforcing material. In one exemplary embodiment, for example, the protection film 180 may include polyethylene terephthalate ("PET"), polypropylene ("PP"), polyethylene ("PE"), polytetrafluoroethylene ("PTFE"), polyimide ("PI"), polyamide-imide ("PAI"), polyether ether ketone ("PEEK"), liquid crystal polymer ("LCP"), polyketone ("PK"), steel use stainless ("SUS"), or carbon fiber. One end portion of the protection film 180 may be bound by the binding unit 140. The protection film 180 may be provided as a separate layer or may be provided by being bonded to the first electrode assembly sheet 110, the second electrode assembly sheets 120 and 120', or the separator films 115 and 116. In such an embodiment, a stiffness of the protection film 180 may be greater than a stiffness of the first or second separator film 115 or 116. That is, a flexibility of the protection film 180 may be less than a flexibility of the first or second separator film 115 or 116. In an exemplary embodiment, the flexibility of the protection film 180 may be less than the flexibility of the first electrode sheet 113.

Figure 17:
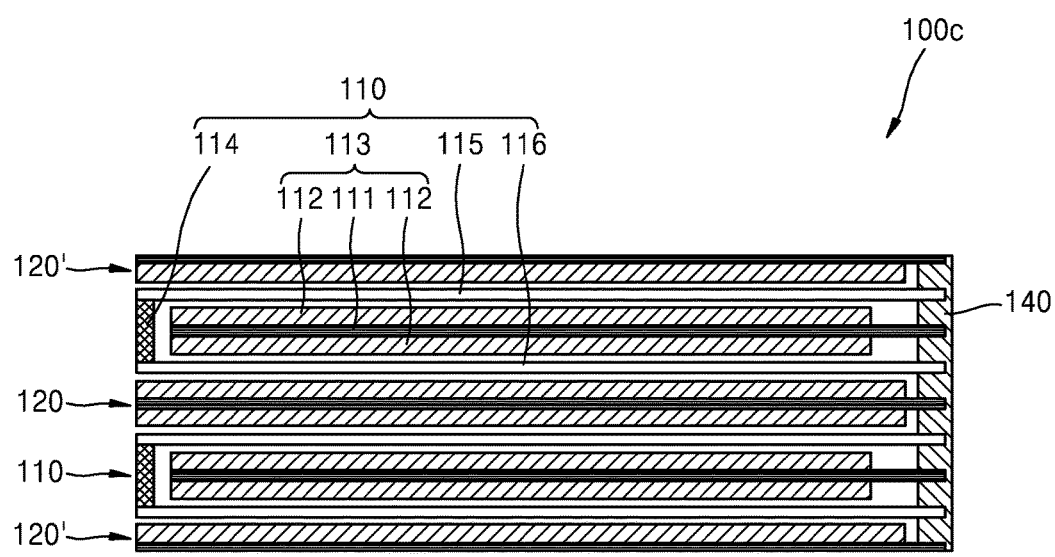
FIG. 17 is a cross-sectional view illustrating yet another alternative exemplary embodiment of an electrode assembly according to the invention.

FIG. 17 is a cross-sectional view illustrating another alternative exemplary embodiment of an electrode assembly 100*c* according to the invention. An exemplary embodiment of the electrode assembly 100*c* of FIG. 17 is substantially the same as the electrode assembly 100 of FIG. 4, except that one end portion of the first electrode sheet 113 is bound by the binding unit 140. In such an embodiment, as shown in FIG. 17, the first electrode collector 111 of the first electrode sheet 113 may be bound by the binding unit 140. Alternatively, the first active material layer 112 may be bound by the binding unit 140, or both of the first electrode collector 111 and the first active material layer 112 may be bound by the binding unit 140.

Figure 18:
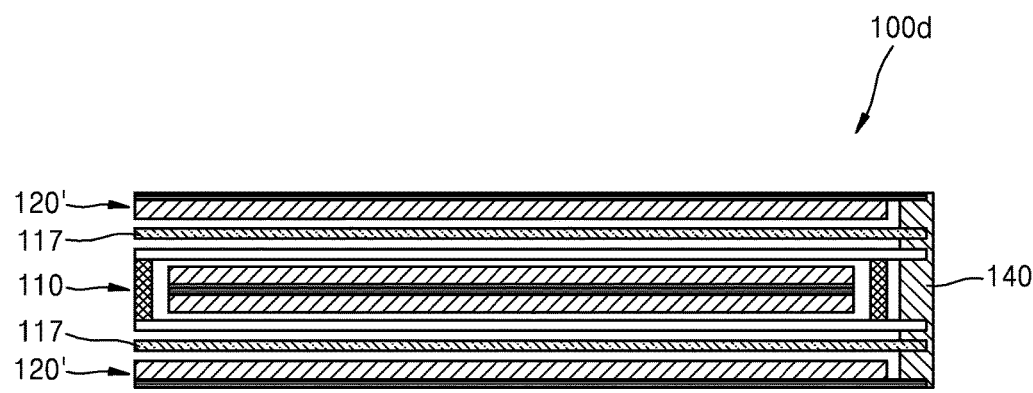
FIG. 18 is a cross-sectional view illustrating still another alternative exemplary embodiment of an electrode assembly according to the invention.

FIG. 18 is a cross-sectional view illustrating another alternative exemplary embodiment of an electrode assembly 100*d* according to the invention. In an exemplary embodiment, as shown in FIG. 18, the second electrode assembly sheets 120' are disposed only at the outside of an electrode stack structure. The electrode assembly 100*d* of FIG. 18 is substantially the same as the electrode assembly 100 of FIG. 4, except that an additional separator film 117 are further disposed between the first electrode assembly sheet 110 and the second electrode assembly sheet 120'. The additional separator film 117 may effectively prevent a short circuit that may be generated between the first electrode sheet 113 and the second electrode sheet when at least one of the first and second separator films 115 and 116 of FIG. 4 is damaged. In such an embodiment, one end portion of the additional separator film 117 may be bound by the binding unit 140.

Figure 19:
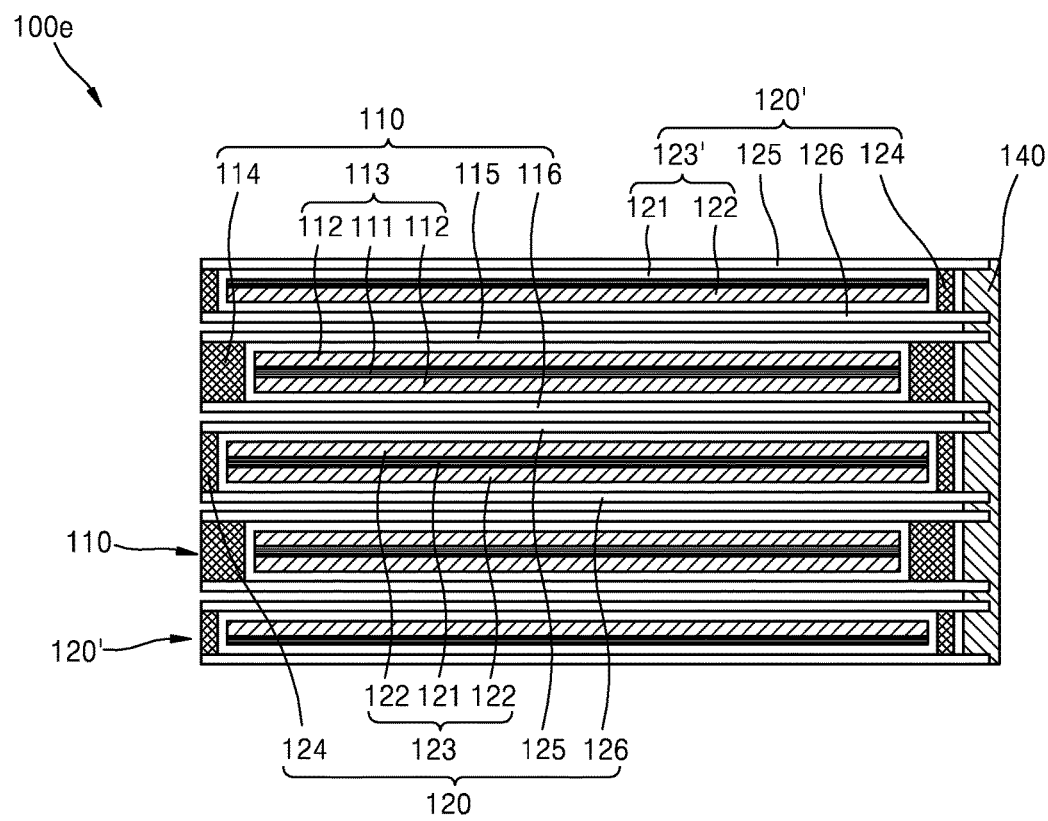
FIG. 19 is a cross-sectional view illustrating still another alternative exemplary embodiment of an electrode assembly according to the invention.

FIG. 19 is a cross-sectional view illustrating another alternative exemplary embodiment of an electrode assembly 100*e* according to the invention.

Referring to FIG. 19, an exemplary embodiment of the electrode assembly 100*e* may include an electrode stack structure and the binding unit 140 that binds one end portion of the electrode stack structure. The electrode stack structure may include a first electrode assembly sheet 110 having flexibility and second electrode assembly sheets 120 and 120', each having flexibility. The first and second electrode assembly sheets 110, 120, and 120' are alternately stacked with one another or disposed one on another.

The first electrode assembly sheet 110 may include the first and second separator films 115 and 116 that are disposed to face each other and include a porous polymer film, the first electrode sheet 113 that is disposed between the first and second separator films 115 and 116, and a first confining unit 114 that restricts the movement of the first electrode sheet 113. The first electrode sheet 113 may include the first electrode collector 111 and the first active material layer 112 disposed on the first electrode collector 111. The first active material layer 112 may be disposed on one of opposing surfaces or both of the opposing surfaces of the first electrode collector 111. The first confining unit 114 that restricts the movement of the first electrode sheet 113 may be disposed between the first and second separator films 115 and 116. In such an embodiment, the first confining unit 114 may include a first connecting member that connects the first separator film 115 and the second separator film 116. In an alternative exemplary embodiment, the first confining unit 114 may be defined by a bonding portion (See FIG. 11) of the first and second separator films 115 and 116 or a folded portion (See FIG. 12) of the first and second separator films 115 and 116 which are integrally formed as a single unitary and indivisible unit. In such an embodiment, the first electrode sheet 113 may be bonded to at least one of the first and second separator films 115 and 116.

The second electrode assembly sheets 120 and 120' may include third and fourth separator films 125 and 126 that are disposed to face each other and include a porous polymer film, second electrode sheets 123 and 123' disposed between the third and fourth separator films 125 and 126, a second confining unit 124 that restricts movements of the second electrode sheets 123 and 123'. The second electrode sheets 123 and 123' may include the second electrode collector 121 and the second active material layer 122 disposed on the second electrode collector 121. The second active material layer 122 may be disposed on one of opposing surfaces or both of the opposing surfaces of the second electrode collector 121. The second confining unit 124, which restricts the movements of the second electrode sheets 123 and 123', is disposed between the third and fourth separator films 125 and 126. The second confining unit 124 may include a second connecting member that connects the third separator film 125 and the fourth separator film 126. In an alternative exemplary embodiment, the second confining unit 124 may be defined by a bonded portion of the third and fourth separator films 125 and 126 or a folded portion of the third and fourth separator films 125 and 126 that are integrally formed as a single unitary and indivisible unit. In such an embodiment, the second electrode sheet 123 may be bonded to at least one of the third and fourth separator films 125 and 126.

The binding unit 140 is disposed at one end portion of the electrode stack structure, and one end portions of the first and second electrode assembly sheets 110, 120 and 120' may be bound by the binding unit 140. In such an embodiment, the first and second separator films 115 and 116 of the first electrode assembly sheet 110 and the third and fourth separator films 125 and 126 of the second electrode assembly sheets 120 and 120' may be bound by the binding unit 140. In such an embodiment, although not shown in FIG. 19, the first electrode sheet 113 and the second electrode sheets 123 and 123' may be bound by the binding unit 140.

Figure 20:
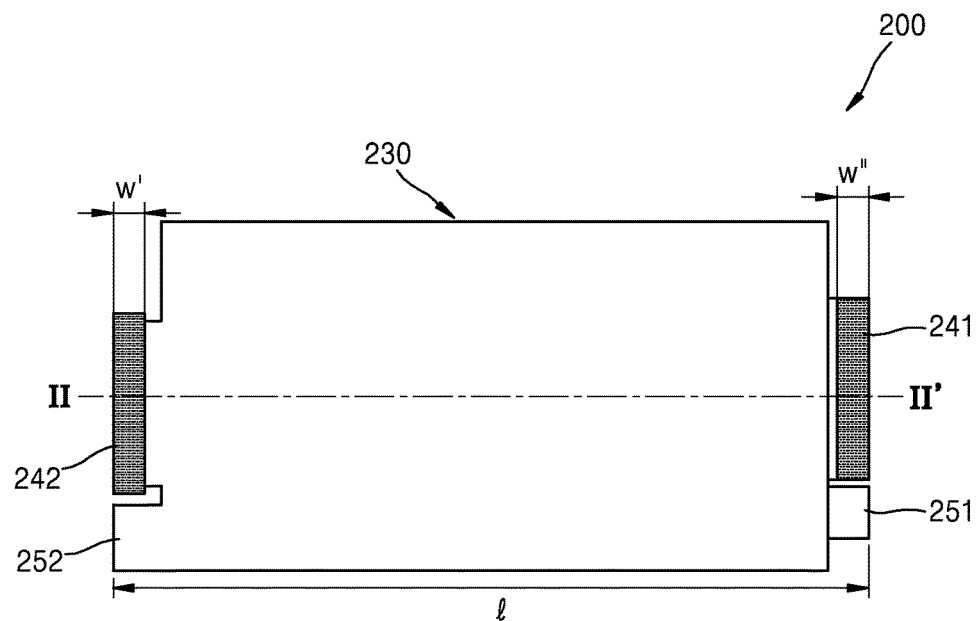
FIG. 20 is a plan view illustrating still another alternative exemplary embodiment of an electrode assembly according to the invention.
Figure 21:
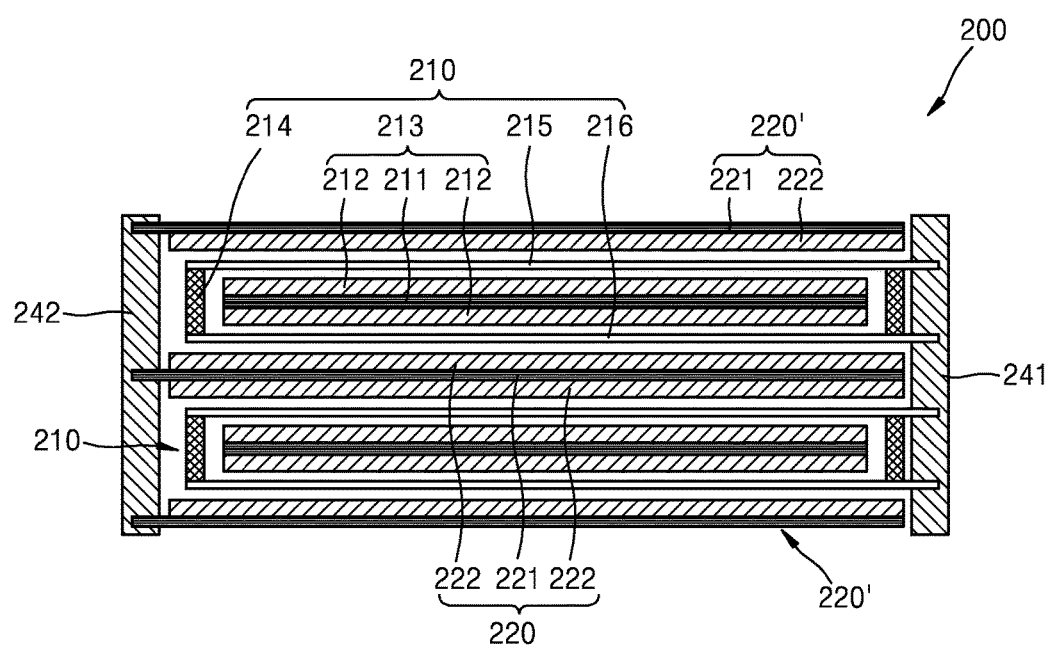
FIG. 21 is a cross-sectional view taken along line II-II' of FIG. 20.

FIG. 20 is a plan view illustrating an exemplary embodiment of an electrode assembly 200 according to the invention. FIG. 21 is a cross-sectional view taken along line II-II' of FIG. 20.

Referring to FIGS. 20 and 21, the electrode assembly 200 may include an electrode stack structure 230, and first and second binding units 241 and 242 that bind the opposite end portions of the electrode stack structure 230. The electrode stack structure 230 may include at least one of a first electrode assembly sheet 210 having flexibility and at least one of second electrode assembly sheets 220 and 220', each having flexibility. The first and second electrode assembly sheets 210, 220 and 220' are alternately stacked with one another or disposed one on another. First and second electrode tabs 251 and 252 extend from the electrode stack structure 230 in a predetermined direction.

The first electrode assembly sheet 210 may include first and second separator films 215 and 216 that are disposed to face each other, a first electrode sheet 213 disposed between the first and second separator films 215 and 216, and the confining unit that restricts the movement of the first electrode sheet 213. The first electrode sheet 213 may include a first electrode collector 211 and a first active material layer 212 disposed on at least one surface of the first electrode collector 211. The first electrode sheet 213 may be a positive electrode sheet or a negative electrode sheet.

The first electrode sheet 213 is disposed between the first and second separator films 215 and 216 which include porous polymer films. A confining unit 214 that restricts the movement of the first electrode sheet 213 is disposed between the first and second separator films 215 and 216. The confining unit 214 may restrict the first electrode sheet 213 from moving in a direction that is perpendicular to a stack direction of the electrode stack structure 230. The confining unit 214 may include a connecting member that connects the first separator film 215 and the second separator film 216. In an alternative exemplary embodiment, the confining unit 214 may include a bonded portion of the first and second separator films 215 and 216 or a folded portion of the first and second separator films 215 and 216 that are integrally formed, as described above. Additionally, the first electrode sheet 213 that is disposed between the first and second separator films 215 and 216 may bonded to at least one of the first and second separator films 215 and 216. The second electrode assembly sheets 220 and 220' may be second electrode sheets that include a second electrode collector 221 and a second active material layer 222 that is disposed on at least one surface of the second electrode collector 221. The second electrode sheet may be a negative electrode sheet or a positive electrode sheet.

The first and second binding units 241 and 242 are disposed at the opposite end portions of the electrode stack structure 230. The opposite end portions of the electrode stack structure 230 may be bound by the first and second binding units 241 and 242. The lengths w" and w' of areas that are bound by the binding units 241 and 242 in the lengthwise direction of the electrode stack structure 230 may be equal to or less than about 0.5 times the length l of the electrode stack structure 230. The positions where the first and second electrode tabs 251 and 252 are drawn may be respectively around the first and second binding units 241 and 242. In an alternative exemplary embodiment, a reinforcement member (not shown) may be further disposed around the first and second electrode tabs 251 and 252, as described above. Each of the first and second binding units 241 and 242 may include the binding member. In an alternative embodiment, each of the first and second binding units 241 and 242 may be defined by a binding hole and a binding material that fills the inside of the binding hole, or each of the first and second binding units 241 and 242 may be defined by a binding hole and a binding ring that is inserted in the binding hole. In such an embodiment, each of the first and second binding units 241 and 242 may be defined by a pressure member or provided by a bonding method using an adhesive or heat welding. In an alternative exemplary embodiment, although it is not illustrated in the drawings, a protection film may be further disposed on an outer surface of the electrode stack structure 230.

Referring to FIG. 21, the first binding unit 241 disposed at one end portion of the electrode stack structure 230 binds the first electrode assembly sheet 210, and the second binding unit 242 disposed at the other end of the electrode stack structure 230 binds the second electrode assembly sheets 220 and 220'. In such an embodiment, the first binding unit 241 binds the first and second separator films 215 and 216 of the first electrode assembly sheet 210. The second binding unit 242 binds the second electrode collector 221 of the second electrode assembly sheets 220 and 220'. In an alternative exemplary embodiment, the second binding unit 242 may bind the second active material layer 222 instead of the second electrode collector 221. In an alternative exemplary embodiment, the second binding unit 242 may bind both of the second electrode collector 221 and the second active material layer 222.

Figure 22:
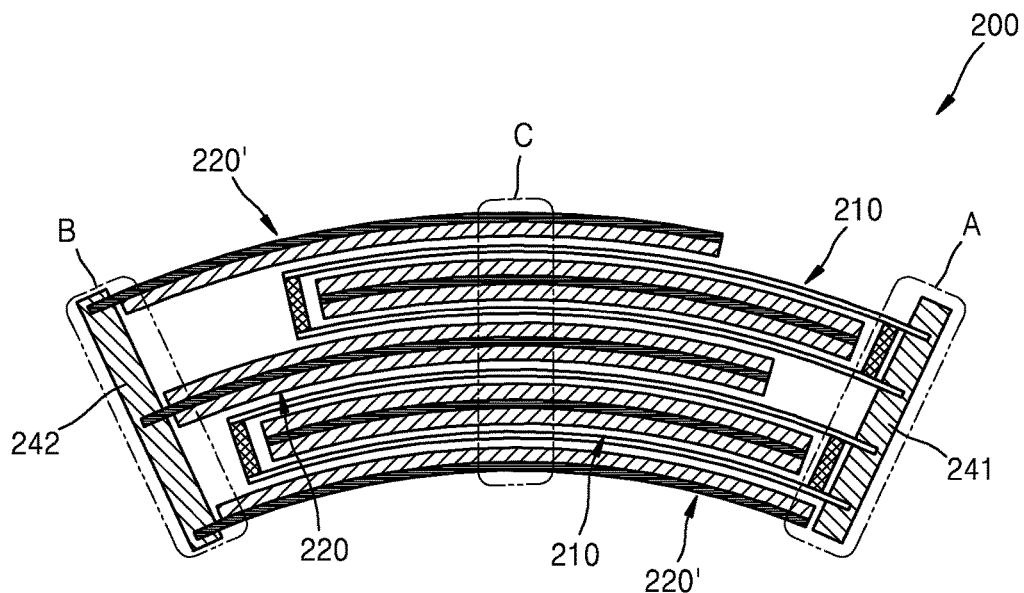
FIG. 22 is a cross-sectional view of the electrode assembly of FIG. 20 in a bent state.

FIG. 22 is a cross-sectional view illustrating the electrode assembly 200 of FIG. 20 in a bent state.

Referring to FIG. 22, when the electrode assembly 200 is bent, slip may occur between the first electrode assembly sheet 210 and the second electrode assembly sheets 220 and 220'. In such an embodiment, where the first end portion A and the second end portion B of the electrode stack structure 230 are bound by the first and second binding units 241 and 242, slip occurs less in the first end portion A and the second end portion B where the first and second binding units 241 and 242 are located, compared to the portion that is not bound. Accordingly, an amount of a relative positional change between the first electrode assembly sheet 210 and the second electrode assembly sheets 220 and 220' when the electrode stack structure 230 is bent may be smaller in the first end portion A and the second end portion B where the first and second binding units 241 and 242 are located than in a center portion C that is located farthest from the first and second binding units 241 and 242 in the lengthwise direction of the electrode stack structure 230.

Figure 23:
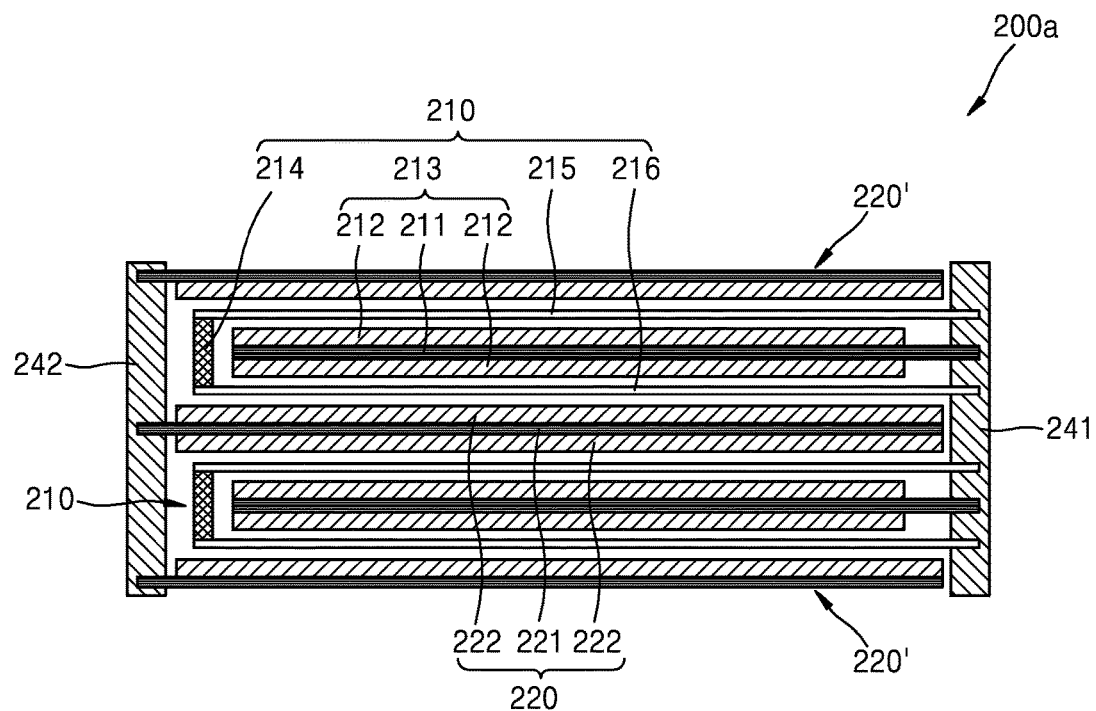
FIG. 23 is a cross-sectional view illustrating another alternative exemplary embodiment of an electrode assembly according to the invention.

FIG. 23 is a cross-sectional view illustrating another alternative exemplary embodiment of an electrode assembly 200a according to the invention.

The electrode assembly 200a of FIG. 23 is substantially the same as the electrode assembly 200 of FIG. 21, except that the one end portion of the first electrode sheet 213 is additionally bound by the first binding unit 241. In such an embodiment, as shown in FIG. 23, the first electrode collector 211 of the first electrode sheet 213 may be bound by the first binding unit 241. In an alternative exemplary embodiment, the first active material layer 212 may be bound by the first binding unit 241, or both of the first electrode collector 211 and the first active material layer 212 may be bound by the first binding unit 241.

Figure 24:
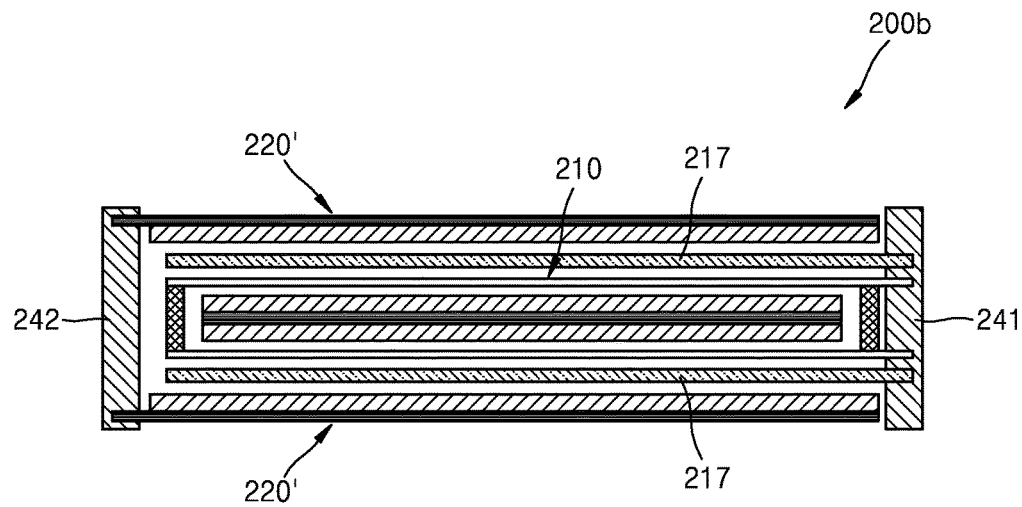
FIG. 24 is a cross-sectional view illustrating yet another alternative exemplary embodiment of an electrode assembly according to the invention.

FIG. 24 is a cross-sectional view illustrating an alternative exemplary embodiment of an electrode assembly 200b according to the invention.

The electrode assembly 200b of FIG. 24 is substantially the same as the electrode assembly 200 of FIG. 21, except that separate separator films 217 are further disposed between the first electrode assembly sheet 210 and the second electrode assembly sheet 220'. The separator films 217 may be bound by the first binding unit 241. In an alternative exemplary embodiment, a portion of the separator films 217 may be bound by the second binding unit 242 instead of the first binding unit 241.

Figure 25:
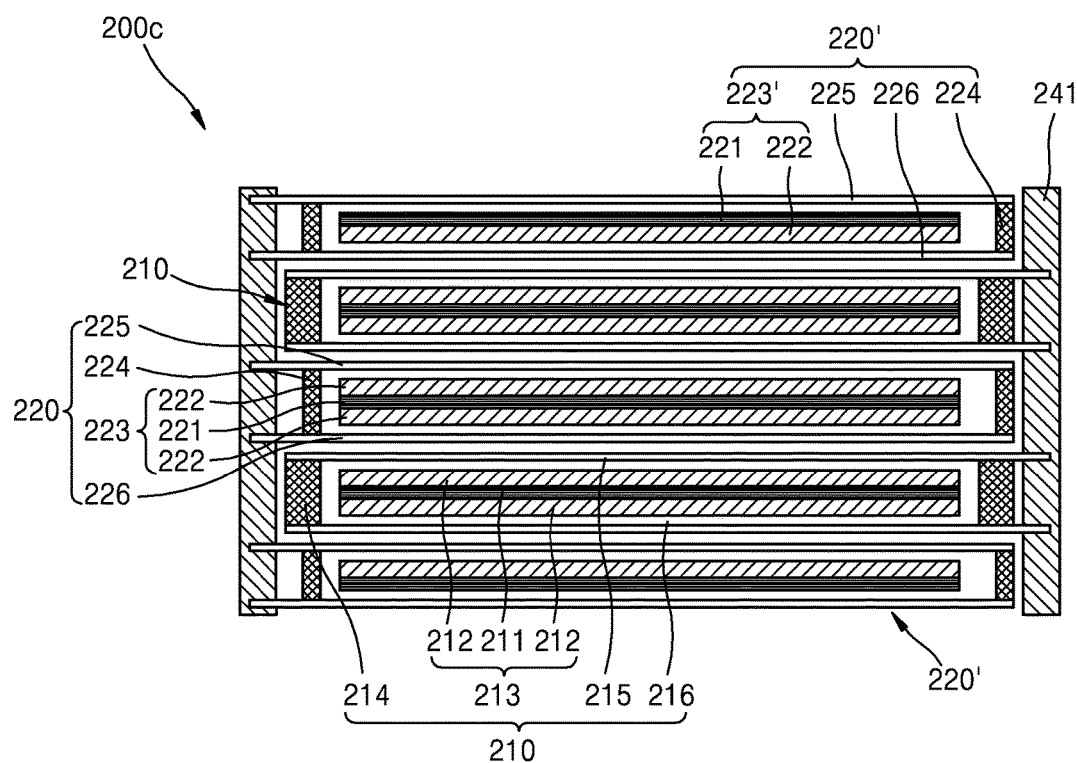
FIG. 25 is a cross-sectional view illustrating still another alternative exemplary embodiment of an electrode assembly according to the invention.

FIG. 25 is a cross-sectional view illustrating an alternative exemplary embodiment of an electrode assembly 200c according to the invention.

Referring to FIG. 25, an exemplary embodiment of the electrode assembly 200c may include an electrode stack structure and the first and second binding units 241 and 242 that bind the opposite end portions of the electrode stack structure. The electrode stack structure may include a first electrode assembly sheet 210 having flexibility and second electrode assembly sheets 220 and 220', each having flexibility. The first and second electrode assembly sheets 210, 220 and 220' are alternately stacked with one another or disposed one on another.

The first electrode assembly sheet 210 may include the first and second separator films 215 and 216 that are disposed to face each other and include a porous polymer film, the first electrode sheet 213 disposed between the first and second separator films 215 and 216, and a first confining unit 214 that restricts the movement of the first electrode sheet 213. The first electrode sheet 213 may include the first electrode collector 211 and the first active material layer 212 disposed on a surface of the first electrode collector 211. The first confining unit 214 that restricts the movement of the first electrode sheet 213 is disposed between the first and second separator films 215 and 216. The first confining unit 214 may include the first connecting member that connects the first separator film 215 and the second separator film 216. In an alternative exemplary embodiment, the first confining unit 214 may be defined by a bonded portion of the first and second separator films 215 and 216 or a folded portion of the first and second separator films 215 and 216 that are integrally formed, as described above. In such an embodiment, the first electrode sheet 213 may be bonded to at least one of the first and second separator films 215 and 216.

The second electrode assembly sheets 220 and 220' may include third and fourth separator films 225 and 226 that are disposed to face each other and include a porous polymer film, second electrode sheets 223 and 223' disposed between the third and fourth separator films 225 and 226, and a second confining unit 224 that restricts the movements of the second electrode sheets 223 and 223'. The second electrode sheets 223 and 223' may include the second electrode collector 221 and the second active material layer 222 that is disposed on at least one surface of the second electrode collector 221. The second confining unit 224, which restricts the movements of the second electrode sheets 223 and 223', is disposed between the third and fourth separator films 225 and 226. The second confining unit 224 may include a second connecting member that connects the third separator film 225 and the fourth separator film 226. In an alternative exemplary embodiment, the second confining unit 224 may include a bonded portion of the third and fourth separator films 225 and 226 or a folded portion of the third and fourth separator films 225 and 226 that are integrally formed as a single unitary and indivisible unit. In such an embodiment, the second electrode sheet 223 may be bonded to at least one of the third and fourth separator films 225 and 226.

The first and second binding units 241 and 242 are disposed at the opposite end portions of the electrode stack structure. The first binding unit 241 disposed at one end portion of the electrode stack structure binds the first electrode assembly sheet 210, and the second binding unit 242 disposed at the other end portion of the electrode stack structure binds the second electrode assembly sheets 220 and 220'. In an exemplary embodiment, the first binding unit 241 binds the first and second separator films 215 and 216 of the first electrode assembly sheet 210, and the second binding unit 242 binds the third and fourth separator films 225 and 226 of the second electrode assembly sheets 220 and 220'. In an alternative exemplary embodiment, the first binding unit 241 may additionally bind the first electrode sheet 213, or the second binding unit 242 may additionally bind the second electrode sheets 223 and 223'.

Figure 26:
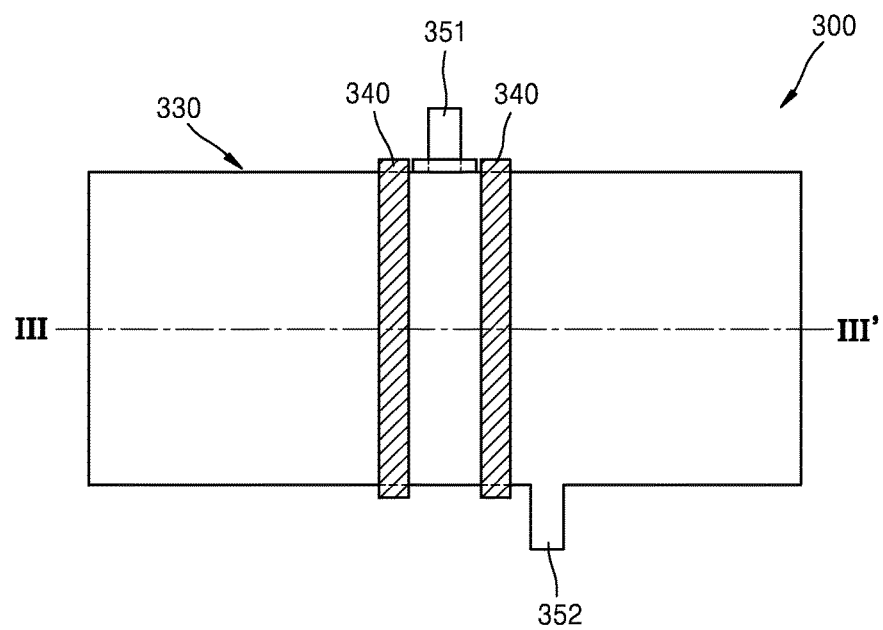
FIG. 26 is a plan view illustrating still another alternative exemplary embodiment of an electrode assembly according to the invention.
Figure 27:
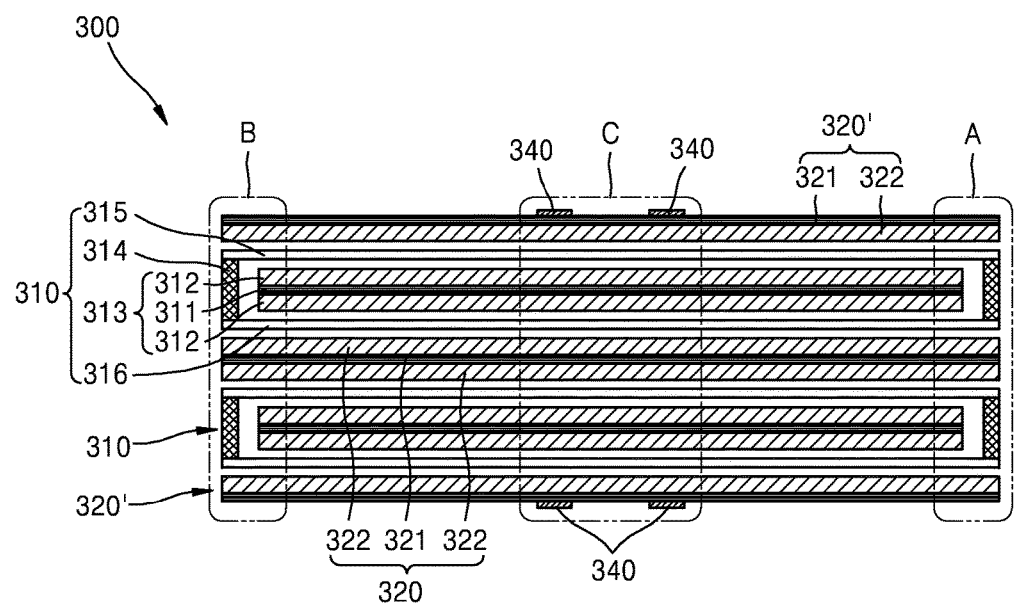
FIG. 27 is a cross-sectional view taken along line III-III' of FIG. 26.

FIG. 26 is a plan view illustrating an exemplary embodiment of an electrode assembly 300 according to the invention. FIG. 27 is a cross-sectional view taken along line III-III' of FIG. 26.

Referring to FIGS. 26 and 27, an exemplary embodiment of the electrode assembly 300 may include an electrode stack structure 330 and a binding unit 340 that binds a part between the opposite end portions A and B of the electrode stack structure 330. The electrode stack structure 330 may include a first electrode assembly sheet 310 having flexibility, and second electrode assembly sheets 320 and 320', each having flexibility. The first and second electrode assembly sheets 310, 320 and 320' are alternately stacked with one another or disposed one on another. First and second electrode tabs 351 and 352 extend from the electrode stack structure 330 in a predetermined direction, for example, a direction perpendicular to a lengthwise direction of the electrode stack structure 330.

The first electrode assembly sheet 310 may include first and second separator films 315 and 316 that are disposed to face each other, a first electrode sheet 313 disposed between the first and second separator films 315 and 316, and a confining unit 314 that restricts the movement of the first electrode sheet 313. The first electrode sheet 313 may include a first electrode collector 311 and a first active material layer 312 disposed on a surface of the first electrode collector 311. The first electrode sheet 313 may be a positive electrode sheet or a negative electrode sheet.

The first electrode sheet 313 is disposed between the first and second separator films 315 and 316 that include a porous polymer film. The confining unit 314 that restricts the movement of the first electrode sheet 313 is disposed between the first and second separator films 315 and 316. The confining unit 314 may restricts the first electrode sheet 313 from moving in at least one of directions perpendicular to a stack direction of the electrode stack structure 330. The confining unit 314 may include a connecting member that connects the first separator film 315 and the second separator film 316. In an alternative exemplary embodiment, the confining unit 314 may include a bonded portion of the first and second separator films 315 and 316 or a folded portion of the first and second separator films 315 and 316 that are integrally formed, as described above. In such an embodiment, the first electrode sheet 313 disposed between the first and second separator films 315 and 316 may be bonded to at least one of the first and second separator films 315 and 316. The second electrode assembly sheets 320 and 320' may be second electrode sheets that include a second electrode collector 321 and a second active material layer 322 that is disposed on at least one surface of the second electrode collector 321. The second electrode sheet may be a negative electrode sheet or a positive electrode sheet.

The binding unit 340 is disposed between the opposite end portions A and B of the electrode stack structure 330. In an exemplary embodiment, the binding unit 340 may be disposed at a center portion C of the electrode stack structure 330. The center portions C of the first and second electrode assembly sheets 310, 320, and 320' may be bound by the binding unit 340. In an exemplary embodiment, as shown in FIGS. 26 and 27, two binding units 340 may be disposed to be separated from each other at the center portion C of the electrode stack structure 330. The first electrode tab 351 extends from the electrode stack structure 330 between the binding units 340, and the second electrode tab 352 extends from the electrode stack structure 330 adjacent to the binding units 340, not from between the binding units 340. However, exemplary embodiments are not limited thereto, and the positions from which the first and second electrode tabs 351 and 352 extend may be variously modified. In an alternative exemplary embodiment, one or three or more binding units 340 may be disposed at the center portion C of the electrode stack structure 330. The positions from which the first and second electrode tabs 351 and 352 extend may be defined around the binding unit 340, and a reinforcement member (not shown) may be disposed around the first and second electrode tabs 351 and 352. The binding unit 340 may be defined by a binding member, or by a binding hole and a binding material that fills the inside of the binding hole. In an exemplary embodiment, the binding unit 340 may be defined by a binding hole and a binding ring inserted into the binding hole. The binding unit 340 may be provided by bonding using an adhesive or heat welding. In an alternative exemplary embodiment, although it is not illustrated in the drawings, a protection film may be further disposed on an outer surface of the electrode stack structure 330.

Figure 28:
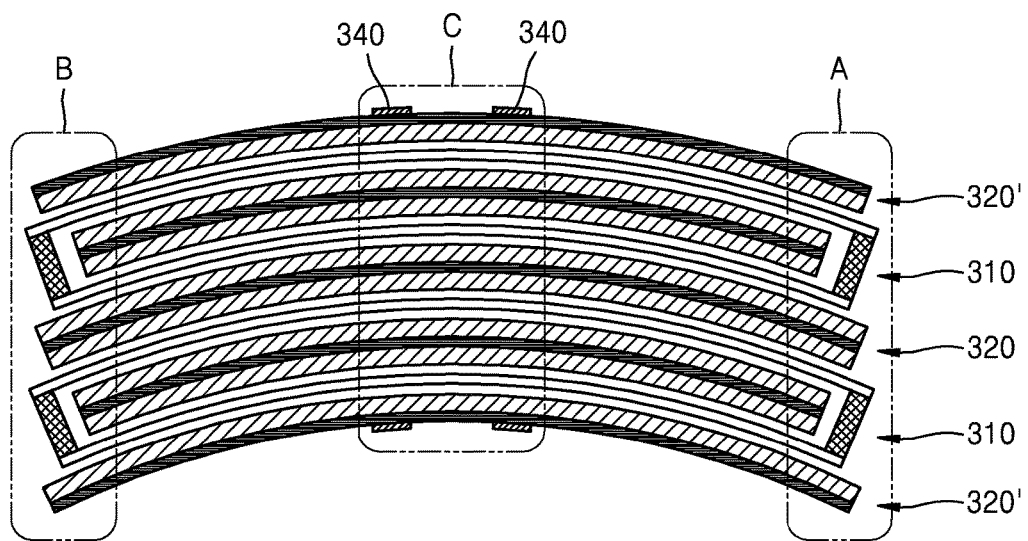
FIG. 28 is a cross-sectional view illustrating the electrode assembly of FIG. 27 in a bent state.

FIG. 28 is a cross-sectional view illustrating the electrode assembly 300 of FIG. 27 in a bent stated.

Referring to FIG. 28, when an exemplary embodiment of the electrode assembly 300 is bent, slip may occur between the first electrode assembly sheet 310 and the second electrode assembly sheets 320 and 320'. In such an embodiment, as shown in FIGS. 27 and 28, since the center portion C of the electrode stack structure 330 is bound by the binding unit 340, slip occurs less in the center portion C compared to a portion that is not bound. Accordingly, an amount of a relative positional change between the first electrode assembly sheet 310 and the second electrode assembly sheets 320 and 320' when the electrode stack structure 330 is bent may be smaller in the center portion C than in the opposite end portions A and B that are located farthest from the binding unit 340 in the lengthwise direction of the electrode stack structure 330.

Figure 29:
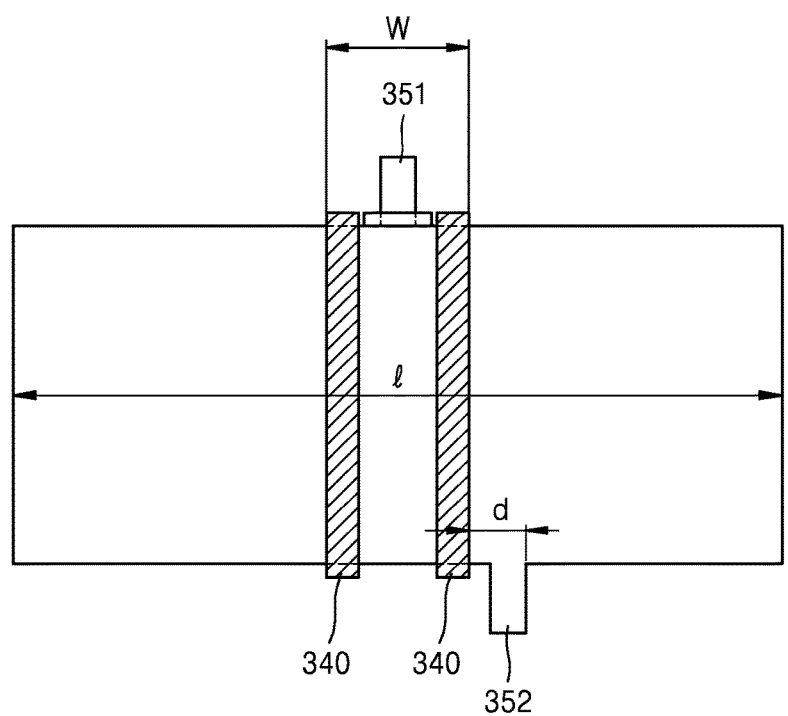
FIG. 29 is a plan view illustrating a relationship between the electrode tabs and the binding unit in the electrode assembly of FIG. 26.

FIG. 29 is a plan view illustrating a relationship between the first and second electrode tabs 351 and 352 and the binding unit 340 in the electrode assembly 300 of FIG. 26. Referring to FIG. 29, in an exemplary embodiment of the electrode assembly 300, the first and second electrode tabs 351 and 352 may be disposed adjacent to the binding unit 340 to prevent damage therein or thereof. In such an embodiment, the first electrode tab 351 may extend from an area bound by the binding unit 340 in the lengthwise direction of the electrode stack structure 330, and the second electrode tab 352 may extend from an area outside the area bound by the binding unit 340. In one exemplary embodiment, for example, an interval d between the binding unit 340 and the position where the second electrode tab 352 extend may be equal to or less than about 0.3 times the length l of the electrode stack structure 330. However, the invention is not limited thereto. In an exemplary embodiment, the length w of an area bound by the binding unit 340 in the lengthwise direction of the electrode stack structure 330 may be equal to or less than about 0.5 times the length l of the electrode stack structure 330.

Figure 30:
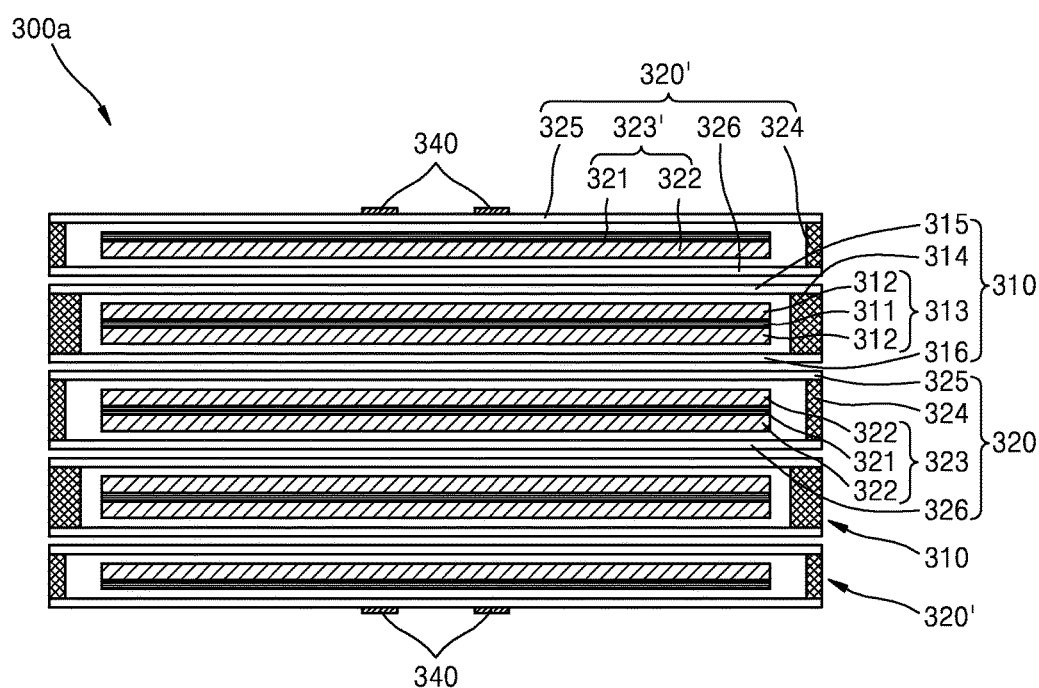
FIG. 30 is a cross-sectional view illustrating another alternative exemplary embodiment of an electrode assembly according to the invention.

FIG. 30 is a cross-sectional view illustrating another alternative exemplary embodiment of an electrode assembly 300a according to the invention.

Referring to FIG. 30, an exemplary embodiment of the electrode assembly 300a may include an electrode stack structure and the binding unit 340 that binds a part between the opposite end portions of the electrode stack structure. The electrode stack structure may include the first electrode assembly sheet 310 having flexibility, and the second electrode assembly sheets 320 and 320' each having flexibility. The first electrode assembly sheet 310 may include the first and second separator films 315 and 316 that are disposed to face each other and include a porous polymer film, the first electrode sheet 313 disposed between the first and second separator films 315 and 316, and the first confining unit that restricts the movement of the first electrode sheet 313. A first confining unit 314 may include a first connecting member that connects the first separator film 315 and the second separator film 316. In an alternative exemplary embodiment, the first confining unit 314 may include a bonding portion of the first and second separator films 315 and 316 or folded portions of the first and second separator films 315 and 316 that are integrally formed, as described above. In such an embodiment, the first electrode sheet 313 may be bonded to at least one of the first and second separator films 315 and 316.

The second electrode assembly sheets 320 and 320' may include the third and fourth separator films 325 and 326 that are disposed to face each other and include porous polymer films, the second electrode sheets 323 and 323' disposed between the third and fourth separator films 325 and 326, and a second confining unit 324 that restricts the movements of the second electrode sheets 323 and 323'. The second confining unit 324 may include a second connecting member that connects the third separator film 325 and the fourth separator film 326. In an alternative exemplary embodiment, the second confining unit 324 may include a bonding portion of the third and fourth separator films 325 and 326 or folded portions of the third and fourth separator films 325 and 326 that are integrally formed, as described above. In an exemplary embodiment, the second electrode sheet 323 may be bonded to at least one of the third and fourth separator films 325 and 326. In an exemplary embodiment, the binding unit 340 may be disposed between the opposite end portions of the electrode stack structure. In such an embodiment, the binding unit 340 may be disposed at the center portion of the electrode stack structure. The center portions of the first and second electrode assembly sheets 310, 320, and 320' may be bound by the binding unit 340.

Figure 31:
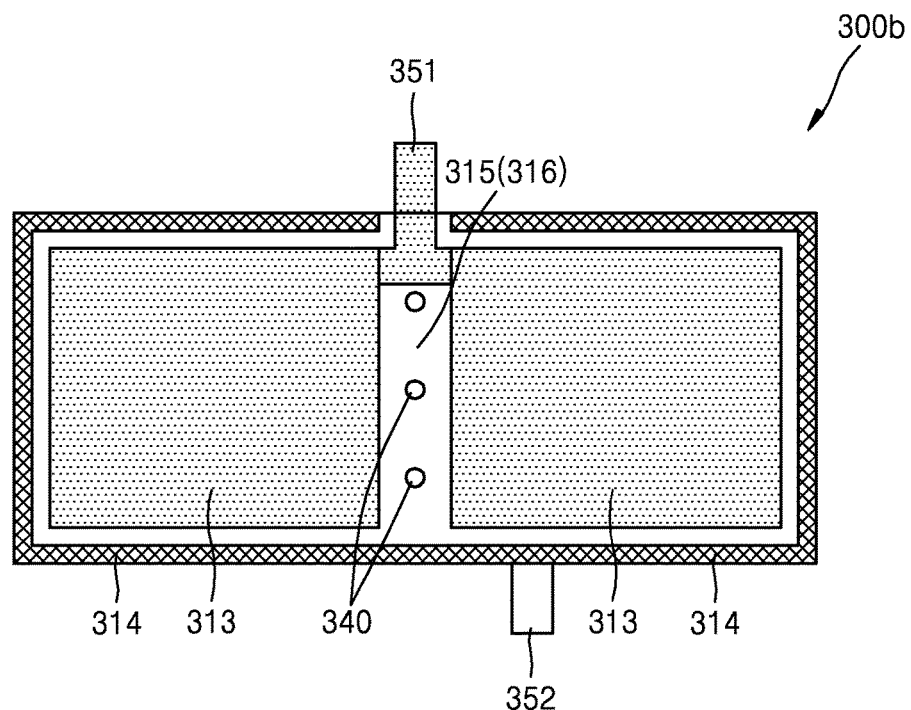
FIG. 31 is a plan view illustrating yet another alternative exemplary embodiment of an electrode assembly according to the invention.

FIG. 31 is a plan view illustrating another alternative exemplary embodiment of an electrode assembly 300b according to the invention. The electrode assembly 300b of FIG. 31 is substantially the same as the electrode assembly 300 of FIG. 26, except that only the first and second separator films 315 and 316 are bound by the binding unit 340 that is disposed at the center portion. Referring to FIG. 31, the first electrode sheets 313 are disposed at the opposite sides of the binding unit 340, and the confining unit 314 that restricts the movements of the first electrode sheets 313 is disposed between the first and second separator films 315 and 316. The confining unit 314 may include the connecting member that connects the first and second separator films 315 and 316 to surround the first electrode sheets 313. In such an embodiment, the confining unit 314 may include a bonding portion of the first and second separator films 315 and 316 or folded portions of the first and second separator films 315 and 316 that are integrally formed, as described above. In such an embodiment, although it is not illustrated in FIG. 31, the second electrode sheets corresponding to the first electrode sheets 313 may be disposed at the opposite sides of the binding unit 340.

Figure 32:
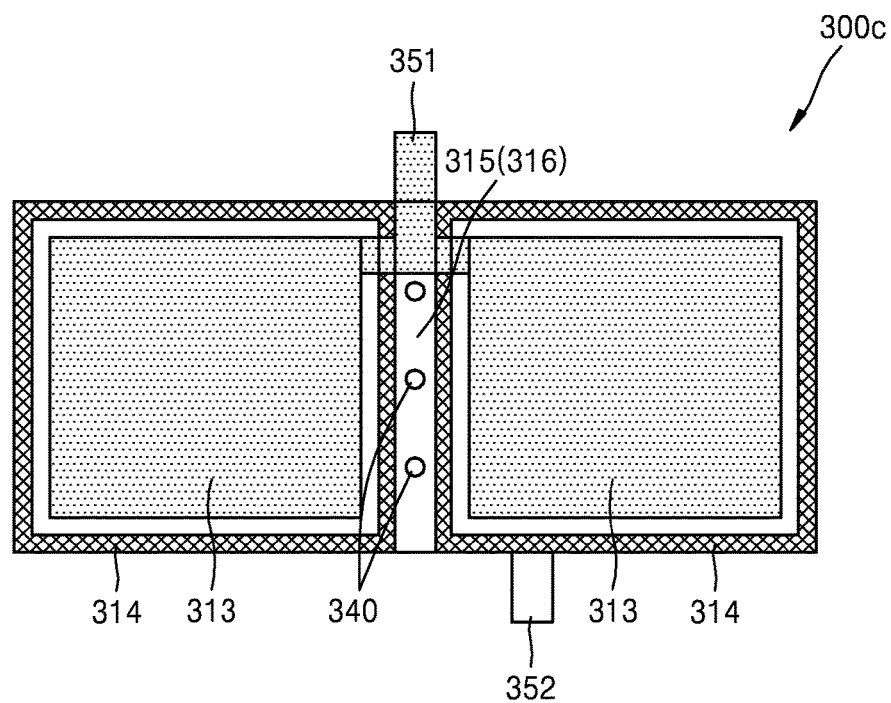
FIG. 32 is a plan view illustrating still another alternative exemplary embodiment of an electrode assembly according to the invention.

FIG. 32 is a plan view illustrating another alternative exemplary embodiment of an electrode assembly 300c according to the invention. The electrode assembly 300c of FIG. 32 is substantially the same as the electrode assembly of FIG. 31, except that the confining unit 314, which surrounds the first electrode sheets 313, is disposed at the opposite sides of the binding unit 340.

Figure 33:
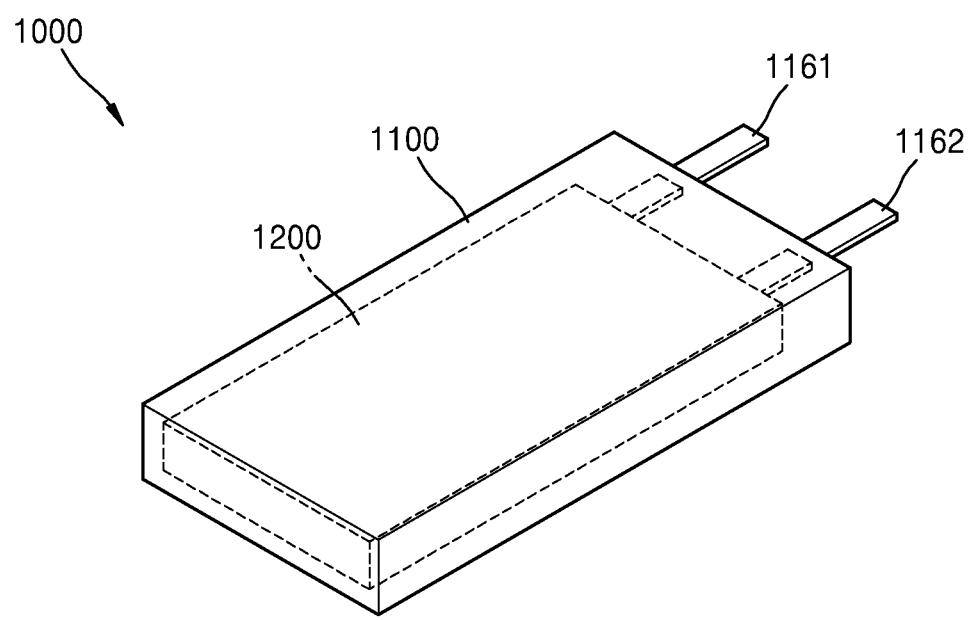
FIG. 33 is a perspective view illustrating an exemplary embodiment of an electro-chemical device according to the invention.

FIG. 33 illustrates an exemplary embodiment of an electro-chemical device 1000 according to the invention. Referring to FIG. 33, the electro-chemical device 1000 may include an exterior member 1100, an electrode assembly 1200 and an electrolyte packed or contained in the exterior member 1100. In such an embodiment, the electrode assembly 1200 may be one of the exemplary embodiments of the electrode assembly 100, 100a, 100b, 100c, 100d, 100e, 200, 200a, 200b, 200c, 300, 300a, 300b and 300c described herein. In such an embodiment, lead tabs 1161 and 1162 may extend through the exterior member 1100 to the outside of the electro-chemical device 1000.

As described above, according to exemplary embodiments, a portion (e.g., a portion of the first and second electrode assembly sheets) of the electrode stack structure is bound by binding unit, such that misalignment of the first and second electrode assembly sheets may be reduced even when the electrode stack structure is repeatedly bent. In such embodiments, since the binding unit fixes the separator film only, occurrence of a short circuit in the binding unit may be effectively prevented. In such embodiments, since the confining unit restricts the movement of the electrode sheet between the separator films, even when misalignment is generated in the binding unit, occurrence of a short circuit between the positive electrode sheet and the negative electrode sheet may be effectively prevented. In such embodiments, a difference in the size between the positive electrode sheet, the separator film and the negative electrode sheet may be minimized, such that energy density may be substantially improved.

It should be understood that the exemplary embodiments described herein should be considered in a descriptive sense only and not for purposes of limitation. Descriptions of features or aspects within each embodiment should typically be considered as available for other similar features or aspects in other embodiments.

While exemplary embodiments of the invention has been described with reference to the figures, it will be understood by those of ordinary skill in the art that various changes in form and details may be made therein without departing from the spirit and scope of the invention as defined by the following claims.

What is claimed is:
1. An electrode assembly comprising:
an electrode stack structure comprising:
a first electrode assembly sheet having flexibility; and a second electrode assembly sheet having flexibility, wherein the first electrode assembly sheet and the second electrode assembly sheet are alternately disposed one on another; and a binding unit which binds a portion of the electrode stack structure, wherein the first electrode assembly sheet comprises:

a first separator film;

a second separator film disposed opposite to the first separator film;

a first electrode sheet disposed between the first and second separator films, wherein the first electrode sheet comprises a first electrode collector and a first active material layer; and a first confining unit which restricts a movement of the first electrode sheet with respect to the first and second separator films, and wherein the first and second electrode assembly sheets have different polarities, and when the electrode stack structure is bent, a relative positional change occurs between the first electrode assembly sheet and all the second electrode assembly sheets adjacent to the first electrode assembly sheet.

2. The electrode assembly of claim 1, wherein the first and second separator films comprises a porous polymer film.

3. The electrode assembly of claim 1, wherein when the electrode stack structure is bent, an amount of a relative positional change between the first electrode assembly sheet and the second electrode assembly sheet is relatively larger in a portion located farthest from the binding unit in a lengthwise direction of the electrode stack structure, than in a portion where the binding unit is located.

4. The electrode assembly of claim 1, wherein the first electrode assembly sheet and the second electrode assembly sheet are not connected to each other in a portion located farthest from the binding unit in a lengthwise direction of the electrode stack structure.

5. The electrode assembly of claim 1, wherein the electrode stack structure further comprises:

a stretchable member disposed in a portion located farthest from the binding unit in a lengthwise direction of the electrode stack structure, wherein the stretchable member connects the first electrode assembly sheet and the second electrode assembly sheet.

6. The electrode assembly of claim 1, wherein the first confining unit restricts the movement of the first electrode sheet in a direction perpendicular to a stack direction of the electrode stack structure.

7. The electrode assembly of claim 1, wherein the first confining unit comprises:

a connecting member which connects the first separator film and the second separator film; or a bonding portion which bonds the first separator film and the second separator film.

8. The electrode assembly of claim 1, wherein the first separator film and the second separator film define a single unitary and indivisible unit.

9. The electrode assembly of claim 1, wherein the first electrode sheet is bonded to at least one of the first and second separator films.

10. The electrode assembly of claim 9, wherein the at least one of the first and second separator films is bonded to the first active material layer or the first electrode collector of the first electrode sheet.

11. The electrode assembly of claim 1, wherein a range of the movement of the first electrode sheet is restricted between the binding unit and the first confining unit.

12. The electrode assembly of claim 1, wherein the second electrode assembly sheet comprises:

a second electrode sheet comprising a second electrode collector and a second active material layer.

13. The electrode assembly of claim 12, wherein the second electrode assembly sheet further comprises:

a third separator film;

a fourth separator film disposed opposite to the third separator film, wherein the second electrode sheet is interposed between the third and fourth separator films; and a second confining unit which restricts a movement of the second electrode sheet with respect to the third and fourth separator films.

14. The electrode assembly of claim 13, wherein the third and fourth separator films comprises a porous polymer film.

15. The electrode assembly of claim 13, wherein the second electrode sheet is bonded to at least one of the third and fourth separator films.

16. The electrode assembly of claim 12, wherein the electrode stack structure further comprises an additional separator film disposed between the first electrode assembly sheet and the second electrode assembly sheet.

17. The electrode assembly of claim 1, wherein the binding unit is disposed at one end portion or at each of opposite end portions of the electrode stack structure, or between the opposite end portions of the electrode stack structure.

18. The electrode assembly of claim 1, wherein at least one of the first separator film, the second separator film and the second electrode assembly sheet is bound by the binding unit.

19. The electrode assembly of claim 18, wherein the first electrode sheet is bound by the binding unit.

20. The electrode assembly of claim 1, wherein the binding unit comprises at least one of a binding member, a binding hole, a pressure member, and a bonded portion of the electrode stack structure.

21. The electrode assembly of claim 1, further comprising:

a protection film disposed on an outer surface of the electrode stack structure.

22. The electrode assembly of claim 21, wherein a flexibility of the protection film is less than a flexibility of the first or second separator film.

23. The electrode assembly of claim 1, further comprising:

an electrode tab which extends from the electrode stack structure and is electrically connected to each of the first and second electrode assembly sheets.

24. The electrode assembly of claim 23, wherein the electrode tab is disposed adjacent to the binding unit.

25. The electrode assembly of claim 24, wherein an interval between a position where the electrode tab extends and the binding unit is equal to or less than about 0.3 times a length of the electrode stack structure.

26. The electrode assembly of claim 23, further comprising:

a reinforcement member disposed around the electrode tab.

27. The electrode assembly of claim 1, wherein a length of an area bound by the binding unit is equal to or less than about 0.5 times a length of the electrode stack structure.

28. An electrochemical device comprising:
an electrode assembly;
an electrolyte; and
an exterior member which contains the electrode assembly and the electrolyte,
wherein the electrode assembly comprises:
an electrode stack structure comprising:
a first electrode assembly sheet having flexibility; and
a second electrode assembly sheet having flexibility, wherein the first and second electrode assembly sheets are alternately disposed one on another; and
a binding unit which binds a portion of the electrode stack structure,
wherein the first electrode assembly sheet comprises:
a first separator film;
a second separator film disposed opposite to the first separator film;
a first electrode sheet disposed between the first and second separator films, wherein the first electrode sheet comprises a first electrode collector and a first active material layer; and
a first confining unit which restricts a movement of the first electrode sheet with respect to the first and second separator films, and
wherein the first and second electrode assembly sheets have different polarities, and when the electrode stack structure is bent, a relative positional change occurs between the first electrode assembly sheet and all the second electrode assembly sheets adjacent to the first electrode assembly sheet.

29. The electrochemical device of claim 28, wherein the second electrode assembly sheet comprises:
a second electrode sheet comprising a second electrode collector and a second active material layer.

30. The electrochemical device of claim 29, wherein the second electrode assembly sheet further comprises:
a third separator film;
a fourth separator film disposed opposite to the third separator film, wherein the second electrode sheet is interposed between the third and fourth separator films; and
a second confining unit which restricts a movement of the second electrode sheet with respect to the third and fourth separator films.

31. The electrochemical device of claim 28, wherein
the binding unit is disposed at one end portion or at each of opposite end portions of the electrode stack structure, or
the binding unit is disposed between opposite end portions of the electrode stack structure.

32. The electrochemical device of claim 28, wherein the electrode assembly further comprises:
a protection film disposed on an outer surface of the electrode stack structure.

33. The electrochemical device of claim 28, wherein the electrode assembly further comprises:
an electrode tab which extends from the electrode stack structure and is disposed adjacent to the binding unit.

* * * * *